(12) United States Patent
Wick et al.

(10) Patent No.: US 8,255,950 B1
(45) Date of Patent: Aug. 28, 2012

(54) DYNAMIC IDENTIFICATION OF OTHER VIEWERS OF A TELEVISION PROGRAM TO AN ONLINE VIEWER

(75) Inventors: Christina Ann Wick, McLean, VA (US); Andrew L. Wick, McLean, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 12/705,222

(22) Filed: Feb. 12, 2010

Related U.S. Application Data

(63) Continuation of application No. 10/974,969, filed on Oct. 28, 2004, now Pat. No. 7,669,213.

(51) Int. Cl.
  *G06F 3/00* (2006.01)
  *G06F 13/00* (2006.01)
  *H04N 5/445* (2011.01)
  *H04N 7/173* (2011.01)

(52) U.S. Cl. .................... 725/37; 725/109; 725/110

(58) Field of Classification Search .......... 725/37, 725/38, 40, 110, 39, 51, 109, 114, 131; 709/204, 709/206, 231; 715/733, 751, 758
See application file for complete search history.

(56) References Cited

U.S. PATENT DOCUMENTS

| | | |
|---|---|---|
| 5,008,853 A | 4/1991 | Bly et al. |
| 5,021,949 A | 6/1991 | Morten et al. |
| 5,329,619 A | 7/1994 | Page et al. |
| 5,440,551 A | 8/1995 | Suzuki |
| 5,448,566 A | 9/1995 | Richter et al. |
| 5,448,567 A | 9/1995 | Dighe et al. |
| 5,491,800 A | 2/1996 | Goldsmith et al. |
| 5,497,463 A | 3/1996 | Stein et al. |
| 5,499,343 A | 3/1996 | Pettus |
| 5,559,949 A | 9/1996 | Reimer et al. |
| 5,572,643 A | 11/1996 | Judson |
| 5,615,336 A | 3/1997 | Robson et al. |
| 5,694,163 A | 12/1997 | Harrison |
| 5,710,884 A | 1/1998 | Dedrick |
| 5,737,726 A | 4/1998 | Cameron et al. |
| 5,760,771 A | 6/1998 | Blonder et al. |

(Continued)

FOREIGN PATENT DOCUMENTS
WO   WO9734244 A1   9/1997
(Continued)

OTHER PUBLICATIONS

"AOL's Grand Goal; America Online seeks to transform itself into a major Internet player," Information Week, Jul. 31, 1995, lines 7-23, pp. 38-42.

(Continued)

*Primary Examiner* — John Schnurr
(74) *Attorney, Agent, or Firm* — Finnegan, Henderson, Farabow, Garrett & Dunner, LLP

(57) ABSTRACT

Informing a viewer of a television program of the identity of other online identities that represent users concurrently viewing that same television program includes determining dynamically a first television program to which a television viewing device associated with a viewer is tuned and identifying one or more other viewers associated with television viewing devices that are presently tuned to the first television program. Trait information related to the viewer or to the other viewers is stored in a data store related to the first television program. A subset of the other viewers that have similar traits is determined based on the stored trait information. The viewer is graphically informed of the subset of other viewers.

24 Claims, 13 Drawing Sheets

U.S. PATENT DOCUMENTS

| | | |
|---|---|---|
| 5,764,916 A | 6/1998 | Busey et al. |
| 5,799,157 A | 8/1998 | Escallon |
| 5,813,007 A | 9/1998 | Nielsen |
| 5,819,084 A | 10/1998 | Shapiro et al. |
| 5,826,025 A | 10/1998 | Gramlich |
| 5,828,839 A * | 10/1998 | Moncreiff ............... 709/204 |
| 5,845,073 A | 12/1998 | Carlin et al. |
| 5,864,874 A | 1/1999 | Shapiro |
| 5,870,744 A | 2/1999 | Sprague |
| 5,878,219 A | 3/1999 | Vance et al. |
| 5,878,233 A | 3/1999 | Schloss |
| 5,905,493 A | 5/1999 | Belzer et al. |
| 5,944,791 A | 8/1999 | Scherpbier |
| 5,960,173 A | 9/1999 | Tang et al. |
| 5,974,446 A | 10/1999 | Sonnenreich et al. |
| 6,006,331 A | 12/1999 | Chu et al. |
| 6,015,348 A | 1/2000 | Lambright et al. |
| 6,026,429 A | 2/2000 | Jones et al. |
| 6,081,829 A | 6/2000 | Sidana |
| 6,081,830 A | 6/2000 | Schindler |
| 6,148,328 A | 11/2000 | Cuomo et al. |
| 6,199,099 B1 | 3/2001 | Gershman et al. |
| 6,212,548 B1 | 4/2001 | DeSimone et al. |
| 6,243,039 B1 | 6/2001 | Elliot |
| 6,243,714 B1 | 6/2001 | Shapiro et al. |
| 6,301,609 B1 | 10/2001 | Aravamudan et al. |
| 6,423,012 B1 | 7/2002 | Kato et al. |
| 6,425,012 B1 | 7/2002 | Trovato et al. |
| 6,434,599 B1 | 8/2002 | Porter |
| 6,446,119 B1 | 9/2002 | Olah et al. |
| 6,480,885 B1 | 11/2002 | Olivier |
| 6,484,196 B1 | 11/2002 | Maurille |
| 6,487,583 B1 | 11/2002 | Harvey et al. |
| 6,496,851 B1 | 12/2002 | Morris et al. |
| 6,519,629 B2 | 2/2003 | Harvey et al. |
| 6,519,771 B1 | 2/2003 | Zenith |
| 6,539,421 B1 | 3/2003 | Appelman et al. |
| 6,545,722 B1 | 4/2003 | Schultheiss et al. |
| 6,549,937 B1 | 4/2003 | Auerbach et al. |
| 6,564,261 B1 | 5/2003 | Gudjonsson et al. |
| 6,594,673 B1 | 7/2003 | Smith et al. |
| 6,600,503 B2 | 7/2003 | Stautner et al. |
| 6,640,223 B1 | 10/2003 | Jones et al. |
| 6,665,715 B1 | 12/2003 | Houri |
| 6,677,968 B1 | 1/2004 | Appelman |
| 6,678,719 B1 | 1/2004 | Stimmel |
| 6,691,162 B1 | 2/2004 | Wick |
| 6,699,125 B2 | 3/2004 | Kirmse et al. |
| 6,750,881 B1 | 6/2004 | Appelman |
| 6,751,656 B2 | 6/2004 | Kohda et al. |
| 6,754,904 B1 | 6/2004 | Cooper et al. |
| 6,925,469 B2 | 8/2005 | Headings et al. |
| 7,035,926 B1 | 4/2006 | Cohen et al. |
| 7,036,083 B1 | 4/2006 | Zenith |
| 7,058,892 B1 | 6/2006 | MacNaughton et al. |
| 7,068,769 B1 | 6/2006 | Weaver et al. |
| 7,076,545 B2 | 7/2006 | DiMambro |
| 7,076,546 B1 | 7/2006 | Bates et al. |
| 7,080,139 B1 | 7/2006 | Briggs et al. |
| 7,092,952 B1 | 8/2006 | Wilens |
| 7,124,372 B2 * | 10/2006 | Brin ............... 715/751 |
| 7,143,428 B1 | 11/2006 | Bruck et al. |
| 7,240,093 B1 | 7/2007 | Danieli et al. |
| 7,246,371 B2 | 7/2007 | Diacakis et al. |
| 7,269,627 B2 | 9/2007 | Knauerhase |
| 7,297,110 B2 | 11/2007 | Goyal et al. |
| 7,299,257 B2 | 11/2007 | Boyer et al. |
| 7,305,624 B1 | 12/2007 | Siegel |
| 7,337,219 B1 | 2/2008 | Meenan et al. |
| 7,383,339 B1 | 6/2008 | Meenan et al. |
| 7,401,098 B2 | 7/2008 | Baker |
| 7,428,585 B1 | 9/2008 | Owens, II et al. |
| 7,552,460 B2 | 6/2009 | Goldman |
| 2001/0013050 A1 | 8/2001 | Shah |
| 2001/0013069 A1 | 8/2001 | Shah |
| 2002/0010742 A1 | 1/2002 | Kihara et al. |
| 2002/0021307 A1 | 2/2002 | Glenn et al. |
| 2002/0032729 A1 | 3/2002 | Erickson et al. |
| 2002/0049806 A1 | 4/2002 | Gatz et al. |
| 2002/0059526 A1 | 5/2002 | Dillon et al. |
| 2002/0087630 A1 | 7/2002 | Wu |
| 2002/0091936 A1 | 7/2002 | Tema |
| 2002/0097856 A1 | 7/2002 | Wullert |
| 2002/0118809 A1 | 8/2002 | Eisenberg |
| 2002/0119789 A1 | 8/2002 | Friedman |
| 2002/0143565 A1 | 10/2002 | Headings et al. |
| 2002/0144283 A1 | 10/2002 | Headings et al. |
| 2002/0178072 A1 | 11/2002 | Gusler et al. |
| 2002/0188620 A1 | 12/2002 | Doss et al. |
| 2003/0023684 A1 | 1/2003 | Brown et al. |
| 2003/0051161 A1 | 3/2003 | Smith et al. |
| 2003/0055897 A1 | 3/2003 | Brown et al. |
| 2003/0065721 A1 | 4/2003 | Roskind |
| 2003/0078987 A1 | 4/2003 | Serebrennikov |
| 2003/0079024 A1 | 4/2003 | Hough et al. |
| 2003/0105820 A1 | 6/2003 | Haims et al. |
| 2003/0106054 A1 | 6/2003 | Billmaier et al. |
| 2003/0126267 A1 | 7/2003 | Gutta et al. |
| 2003/0129969 A1 | 7/2003 | Rucinski |
| 2003/0130014 A1 | 7/2003 | Rucinski |
| 2003/0154398 A1 | 8/2003 | Eaton et al. |
| 2003/0156138 A1 | 8/2003 | Vronay et al. |
| 2003/0156707 A1 | 8/2003 | Brown et al. |
| 2003/0158855 A1 | 8/2003 | Farnham et al. |
| 2003/0158864 A1 | 8/2003 | Samn |
| 2003/0167310 A1 | 9/2003 | Moody et al. |
| 2003/0174164 A1 | 9/2003 | Capps |
| 2003/0177190 A1 | 9/2003 | Moody et al. |
| 2003/0185232 A1 | 10/2003 | Moore et al. |
| 2003/0191673 A1 | 10/2003 | Cohen |
| 2003/0191753 A1 | 10/2003 | Hoch |
| 2003/0197729 A1 | 10/2003 | Denoue et al. |
| 2003/0204741 A1 | 10/2003 | Schoen et al. |
| 2003/0206195 A1 | 11/2003 | Matsa et al. |
| 2003/0206619 A1 | 11/2003 | Curbow et al. |
| 2003/0208545 A1 | 11/2003 | Eaton et al. |
| 2003/0210265 A1 | 11/2003 | Haimberg |
| 2003/0225834 A1 | 12/2003 | Lee et al. |
| 2003/0225836 A1 | 12/2003 | Lee et al. |
| 2003/0225850 A1 | 12/2003 | Teague |
| 2003/0227487 A1 | 12/2003 | Hugh |
| 2003/0229717 A1 | 12/2003 | Teague |
| 2003/0233265 A1 | 12/2003 | Lee et al. |
| 2003/0233416 A1 | 12/2003 | Beyda |
| 2003/0233417 A1 | 12/2003 | Beyda et al. |
| 2003/0233650 A1 | 12/2003 | Zaner et al. |
| 2004/0001480 A1 | 1/2004 | Tanigawa et al. |
| 2004/0003041 A1 | 1/2004 | Moore et al. |
| 2004/0003046 A1 | 1/2004 | Grabelsky et al. |
| 2004/0017396 A1 | 1/2004 | Werndorfer et al. |
| 2004/0019637 A1 | 1/2004 | Goodman et al. |
| 2004/0019671 A1 | 1/2004 | Metz |
| 2004/0024478 A1 | 2/2004 | Hans et al. |
| 2004/0024822 A1 | 2/2004 | Werndorfer et al. |
| 2004/0029567 A1 | 2/2004 | Timmins et al. |
| 2004/0030750 A1 | 2/2004 | Moore et al. |
| 2004/0031058 A1 | 2/2004 | Reisman |
| 2004/0044723 A1 | 3/2004 | Bell et al. |
| 2004/0054729 A1 | 3/2004 | Fukuizumi et al. |
| 2004/0056901 A1 | 3/2004 | March et al. |
| 2004/0098491 A1 | 5/2004 | Costa-Requena et al. |
| 2004/0103156 A1 | 5/2004 | Quillen et al. |
| 2004/0117831 A1 | 6/2004 | Ellis et al. |
| 2004/0148347 A1 | 7/2004 | Appelman et al. |
| 2004/0153506 A1 | 8/2004 | Ito et al. |
| 2004/0186887 A1 | 9/2004 | Galli et al. |
| 2004/0193684 A1 | 9/2004 | Ben-Yoseph |
| 2004/0196315 A1 | 10/2004 | Swearingen et al. |
| 2004/0199582 A1 | 10/2004 | Kucharewski et al. |
| 2004/0231003 A1 | 11/2004 | Cooper et al. |
| 2005/0004984 A1 | 1/2005 | Simpson |
| 2005/0004995 A1 | 1/2005 | Stochosky |
| 2005/0021854 A1 | 1/2005 | Bjorkner |
| 2005/0066362 A1 | 3/2005 | Rambo |
| 2005/0091314 A1 | 4/2005 | Blagsvedt et al. |
| 2005/0096084 A1 | 5/2005 | Pohja et al. |
| 2005/0108329 A1 | 5/2005 | Weaver et al. |

| | | | |
|---|---|---|---|
| 2005/0114783 A1 | 5/2005 | Szeto | |
| 2005/0149606 A1 | 7/2005 | Lyle et al. | |
| 2005/0171955 A1 | 8/2005 | Hull et al. | |
| 2005/0172001 A1 | 8/2005 | Zaner et al. | |
| 2005/0262542 A1 | 11/2005 | DeWeese et al. | |
| 2005/0289469 A1 | 12/2005 | Chandler et al. | |
| 2006/0009243 A1 | 1/2006 | Dahan et al. | |
| 2006/0031080 A1 | 2/2006 | Mallya et al. | |
| 2006/0047187 A1 | 3/2006 | Goyal et al. | |
| 2006/0136584 A1 | 6/2006 | Decker et al. | |
| 2006/0173702 A1* | 8/2006 | Saxena et al. | 705/1 |
| 2006/0190966 A1 | 8/2006 | McKissick et al. | |
| 2006/0242583 A1 | 10/2006 | MacNaughton et al. | |

FOREIGN PATENT DOCUMENTS

| | | |
|---|---|---|
| WO | WO9737303 A1 | 10/1997 |
| WO | WO9820410 A1 | 5/1998 |
| WO | WO0140957 A1 | 6/2001 |

OTHER PUBLICATIONS

America Online Growing Pains, Newsbytes, Mar. 7, 1995.
Armstrong, R., et al., "Web Watcher: a learning apprentice for the world wide web", Feb. 1, 1995, 7 pages.
Brown et al., "WWW Plug-Ins Companion", Que Corporation, Oct. 1996, pp. 351-362.
U.S. Appl. No. 10/974,969, filed Oct. 28, 2004, 56 pages.
U.S. Appl. No. 11/574,831, filed Mar. 7, 2007, International Application No. PCT PCT/US2004/029291, 44 pages.
European Office Communication issued in Application No. EP 97946924.4-1238 mailed Apr. 5, 2007, 7 pages.
European Oral Proceedings issued in Application No. EP 97946924.4-1238 mailed Feb. 6, 2007, 9 pages.
European Oral Proceedings issued in Application No. EP 97946924.4-1238 mailed Oct. 7, 2007, 8 pages.
International Application No. PCT/US2004/029291, filed Sep. 8, 2004, 47 pages.
International Search reported issued in International Application No. PCT/US97/20597 mailed Apr. 21, 1998, 2 pages.
Office Action mailed Apr. 21, 2005 for European Application No. 97946924.4-1238, 10 pages.
Office Action mailed Apr. 25, 2005 for European Application No. 97946924.4-1238, 6 pages.
European Office Action issued in European Application No. 97946924.4-1238 mailed May 21, 2008, 10 pages.
Gross, Tom, et al., "Computer-Supported cooperative work and internet", IEEE, 1996, pp. 425-430.
Haim Schneider, Lotus Developer Domain, "Adding a popup menu to your Sametime links", Jul. 1, 2003, 8 pages.
Hall, Tara, Developer Domain, "Same Place, Sametime with Chris Price", http://www-10.lotus.com/ldd/today.nsf/DisplayForm/.., (visited Jul. 28, 2003), 8 pages.
IBM Lotus Software, Sametime Everyplace FAQ Overview Information, http://www.lotus.com/products/wireless.nsf/allpublic.., (visited Jul. 28, 2003), 3 pages.
IBM Lotus Software, Sametime Everyplace Wireless Collaboration that's Fit for e-Business, http://www.lotus.com/products/wireless.nsf/allpublic.., (visited Jul. 28, 2003), 2 pages.
International Search Report and Written Opinion issued in International Application No. PCT/US05/45630, dated Oct. 23, 2006, 11 pages.
International Search Report and Written Opinion mailed Dec. 27, 2005 for International Application No. PCT/US2004/29291, 15 pages.
International Search Report issued in International Application No. PCT/US03/36795 mailed Jun. 23, 2004, 9 pages.
Kirk Scott, "Ubique's Virtual Places: Communication and interaction on the World Wide Web", http://www.w3.org/Collaboration/Workshop/Proceedings/P2.html, (visited Jul. 28, 2003), 1 page.
Kirk, Scott, "Ubique's Virtual Places: Communication and interaction on the World Wide Web," http://www.w3.org/Collaboration/Workshop/Proceedings/P2.html, (visited Jul. 28, 2003), 1 page.
LaLiberte et al., "A protocol for scalable group and public annotations", Elsevier, 1995, pp. 911-918.
Lieberman, Henry, "Letizia: An agent that assists web browsing", Aug. 20, 1995, pp. 924-929.
Moore, J., "AOL's Grand Goal—America Online seeks to transform itself into a major internet player," Jul. 31, 1995, 2 pages.
Notice of Allowance issued in U.S. Appl. No. 10/974,969 mailed Sep. 8, 2009, 10 pages.
Notification of Transmittal of the International Search Report or the Declaration dated Jun. 23, 2004 for International Application Serial No. PCT/US03/36795, 9 pages.
Office Action issued in U.S. Appl. No. 10/415,211 mailed Jan. 8, 2008, filed Nov. 18, 2003, 20 pages.
Office Action issued in U.S. Appl. No. 10/715,211 mailed Jan. 8, 2008, 20 pages.
Office Action issued in U.S. Appl. No. 10/715,211 mailed Jul. 11, 2008, 15 pages.
Office Action issued in U.S. Appl. No. 10/974,969 mailed Mar. 17, 2008, 23 pages.
Office Action issued in U.S. Appl. No. 10/974,969 mailed Mar. 6, 2009, 16 pages.
Office Action issued in U.S. Appl. No. 11/408,166 mailed Mar. 18, 2009.
Office Action issued in U.S. Appl. No. 11/408,166 mailed Oct. 7, 2009.
Office Action issued in European Application No. 97946924.4-1238 mailed Apr. 21, 2005, 6 pages.
Prodigy launches 100 interest groups on the world wide web; all sites have deep links to chat and newsgroups; topics range from "adventure travel" and "astrology" to "virtual reality" and "wrestling", Business Wire, Sep. 27, 1995.
Röscheisen et al, "Beyond browsing: shared comments, SOAPs trails, and on-line communities", Elsevier, 1995, pp. 739-749.
Walther, M., "Supporting Development of Synchronous Collaboration Tools on the Web with GroCo", Feb. 2-9, 1996, pp. 1-6.
Allen, R.B. "Retrieval from facet spaces," Jul. 1, 1996, pp. 1-9, http://boballen.info/PAPERS/FACETS/facets.html.
Source Code: WWW4 Program: Tuesday, Dec. 12, 1995, World Wide Web Consortium, Nov. 28, 1995, http://www.w3.org/Conferences/WWW4/Tuesday.html, pp. 1-7.
Greene, Tom, "WWW4: Presenters," World Wide Web Consortium, Dec. 6, 1995, http://www.w3.org/Conferences/WWW4/Presenters.html, pp. 1-2.
Wittenburg et al. "Group Asynchronous Browsing on the World Wide Web," Int'l. World Wide Web Conference, Dec. 12, 1995, http://www.w3,org/Conferences/WWW4/Papers/98/, pp. 1-13.
WWW4 Program for Dec. 12, 1995, World Wide Web Consortium, Nov. 28, 1995, http://www.w3.org/Conferences/WWW4/Tuesday.html, pp. 1-6.

* cited by examiner

DYNAMIC IDENTIFICATION OF OTHER VIEWERS OF A TELEVISION PROGRAM TO AN ONLINE VIEWER

CROSS-REFERENCE TO RELATED APPLICATIONS

This application is a continuation application of U.S. patent application Ser. No. 10,974,969, filed Oct. 28, 2004, and titled "Dynamic Identification of Other Viewers of a Television Program to an Online Viewer," the entire contents are hereby incorporated by reference.

TECHNICAL FIELD

This invention relates to identification of online viewers watching a television program.

BACKGROUND

Online users of the Internet have virtually on-demand access to information such as news, weather, financials, sports, and entertainment as well as the ability to generate electronic messages and to participate in online discussion groups. Many online users may access simultaneously the same or similar online locations and may desire information regarding other individuals accessing those locations. The wealth of available online locations, the large quantity of users who may access the online locations, and the wealth of information associated with the users may impede an online service provider's ability to provide the desired information.

SUMMARY

In one general aspect, informing a viewer of a television program of the identity of other online identities that represent users concurrently viewing that same television program includes determining dynamically a first television program to which a television viewing device associated with a viewer is tuned and identifying one or more other viewers associated with television viewing devices that are presently tuned to the first television program. Trait information related to the viewer or to the other viewers is stored in a data store related to the first television program. A subset of the other viewers that have similar traits is determined based on the stored trait information. The viewer is graphically informed of the subset of other viewers.

Implementations may include one or more of the following features. For example, determining a first television program may include determining a channel or television network to which the television viewing device associated with the viewer is tuned. Determining the first television program may include inferring the first television program based on the television network. A perceivable indicator related to the television network may be displayed.

Identifying other viewers associated with television viewing devices that are tuned to the first television program may include dynamically identifying other viewers associated with a television viewing device that was previously tuned to a second television program and then was tuned to the first television program. A perceivable indicator related to the second television program may be displayed.

Informing a viewer of a television program of the identity of other online identities that represent users concurrently viewing that same television program may further include identifying one or more recent viewers associated with television viewing devices that were tuned to the first television program and then were subsequently tuned to a second television program. Trait information related to the recent viewers is stored in the data store related to the first television program. A subset of the recent viewers that have similar traits based on the stored trait information is determined. The viewer is graphically informed dynamically of the subset of recent viewers. The viewer may be graphically informed of the second television program presently viewed by at least one of the recent viewers.

The trait information may include information related to an age or demographic identifier of the viewer or of an other viewer. Determining a subset of the other viewers may include dynamically determining a subset of the other viewers having an age or demographic identifier similar to an age of the viewer.

The trait information may include information related to an expertise rating, an interest, or a participation status of the viewer or of an other viewer. The participation status may include a visibility preference of the viewer or of the other viewer.

The trait information may include information of an individual selected as an associate by the viewer or by an other viewer. The individual may be a member of the buddy list or contact list of the viewer or of the other viewer.

The trait information may include information related to an online status of the viewer or of the other viewer. The online status may include a status of active, idle, away, and/or mobile.

Informing a viewer of a television program of the identity of other online identities that represent users concurrently viewing that same television program may further include storing other information related to the viewer or to the other viewers in the data store related to the first television program and graphically informing the viewer dynamically of the subset of other viewers based on the stored other information. The other information may include information indicative of an identification of the viewer or of an other viewer. The information indicative of an identification may include an online identifier associated with the viewer or with the other viewer. The other information may include contact information of the viewer or of an other viewer or information based on an activity level associated with the first television program. The activity level corresponds to the number of viewers tuned to the first television program.

Determining a subset of the other viewers may include determining a subset of the other viewers based on a demographic identifier of the other viewers. Determining a subset of the other viewers may include determining a subset of the other viewers based on a similar age of the viewer and of the other viewers.

Graphically informing the viewer dynamically of the subset of other viewers may include informing the viewer of a total number of other viewers, informing the viewer of at least one of the other viewers, or informing the viewer of a trait of at least one of the other viewers. The trait may include an interest of at least one of the other viewers, an interest of an individual selected as an associate by the other viewer, or an expertise of at least one of the other viewers.

Graphically informing the viewer dynamically of the subset of other viewers may include displaying to the viewer information indicative of an other viewer based on the stored trait information. A trait of the other viewer may be indicated graphically. The trait may be an interest or an expertise of the other viewer. The identity of the other viewer may be indicated graphically.

Graphically informing the viewer of the subset of other viewers may include providing a user interface that graphically informs the viewer of the subset of other viewers. The user interface may be manipulated by the viewer to communicate with at least one other viewer in the subset of other viewers. The user interface may be manipulated by the viewer to invoke an instant message or send an e-mail to at least one other viewer in the subset of other viewers. The user interface may be manipulated by the viewer to contact directly at least one other viewer in the subset of other viewers using a voice communication. The voice communication may employ a mobile device. The user interface may be manipulated by the viewer to store contact information of at least one other viewer in the subset of other viewers to a contact list of the viewer. The contact list of the viewer may be a buddy list.

Graphically informing the viewer dynamically of the subset of other viewers may include informing the viewer in the subset of other viewers sorted according to trait information of the viewer. The trait information may include preference information of the viewer. Graphically informing the viewer dynamically of the subset of other viewers may include providing updated information based on a viewer or system designated interval or providing updated information about every 15 or 60 seconds.

Determining a subset of the other viewers may include determining a subset of the other viewers by selecting other viewers associated with trait information of the viewer. The stored trait information may include information indicative of a location related to the viewer.

Informing a viewer of a television program of the identity of other online identities that represent users concurrently viewing that same television program may further include detecting dynamically the television viewing device of the viewer tuning to a second television program and identifying one or more second television program viewers associated with viewing devices that are tuned to the second television program. Second trait information is stored related to the second television program viewers in a second television program data store. A subset of second television program viewers that have similar traits based on the stored second trait information is determined. The viewer is graphically and dynamically informed of the subset of second television program viewers.

In another general aspect, a user interface that informs dynamically a viewer of a television program of the identity of other online identities that represent users concurrently viewing the same television program includes a first interface element structured and arranged to display a television program to which a viewing device associated with a viewer is tuned. The user interface also includes a second interface element structured and arranged to graphically inform the viewer dynamically of a subset of other viewers associated with television viewing devices that are presently tuned to the television program and that have similar traits.

Implementations may include one or more of the following features. For example, the second interface element may be structured and arranged to graphically inform the viewer dynamically of the subset by displaying a perceivable indicator corresponding to an identity of at least one other viewer. The second interface element may be manipulated by the viewer to communicate with at least one other viewer in the subset of other viewers. Communications may include invoking an instant message or sending an e-mail to at least one other viewer in the subset of other viewers. The second interface element may be manipulated by the viewer to contact directly at least one other viewer in the subset of other viewers using a voice communication or to participate in the television program. The second interface element may be manipulated by the viewer to submit a vote related to the television program.

The second interface element may be structured and arranged to graphically inform the viewer of a trait of at least one other viewer. The trait may comprise an interest or an expertise of at least one other viewer.

DESCRIPTION OF DRAWINGS

Like reference symbols in the various drawings indicate like elements.

DETAILED DESCRIPTION

An online service provider may display dynamically and in real time information of other users presently viewing the television program (or channel) as being viewed by the user. For instance, the user may perceive when buddy list members view a television program concurrently with the user, or may perceive a subset of other users who view a television program concurrently with the user and have a shared trait with the user (e.g., male over 35), or combination of connectivity criteria and trait matching information may be used to identify others who concurrently perceive common television programs. The user may perceive other users based on a trait of the other users and/or based on a trait of the user.

Figure 6:
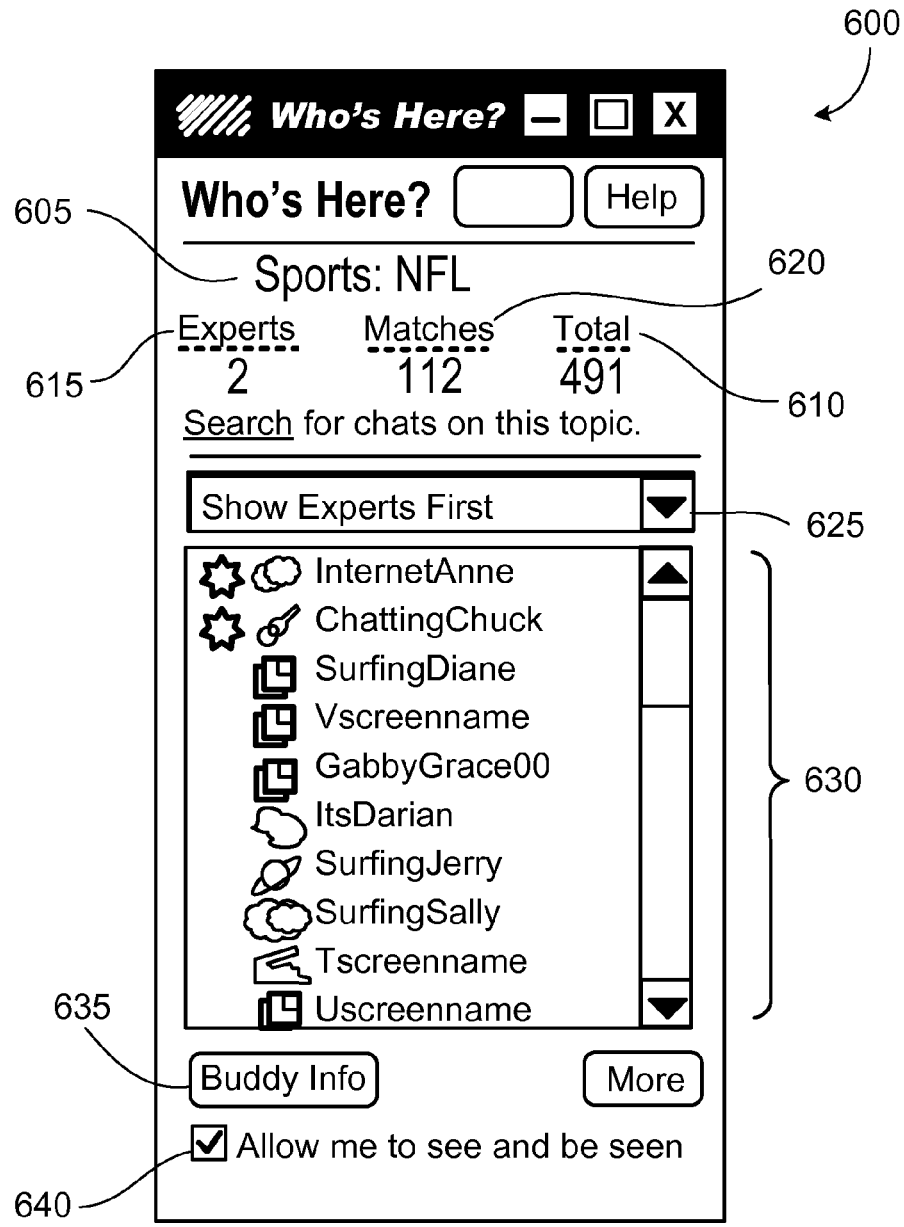
FIG. 6 illustrates an exemplary window that may be used by the system of FIG. 3 to identify other users to an online user.

Referring briefly to FIG. 6, a graphical user interface (GM) 600 displays dynamically and in real time a list of other users presently accessing the same online NFL sports channel as the user. The GUI indicates numerical counts of the number of other users accessing the channel. The GUI may display and order the list of users based on traits, such as, for example, expertise, age and/or gender. The GUI also may be configured to rank and order the other users based on expertise. In any event, the GUI 1000 will update dynamically as the user navigates to other sites on the, presenting to the user in real-time the other users accessing those sites concurrently with the user.

Figure 1:
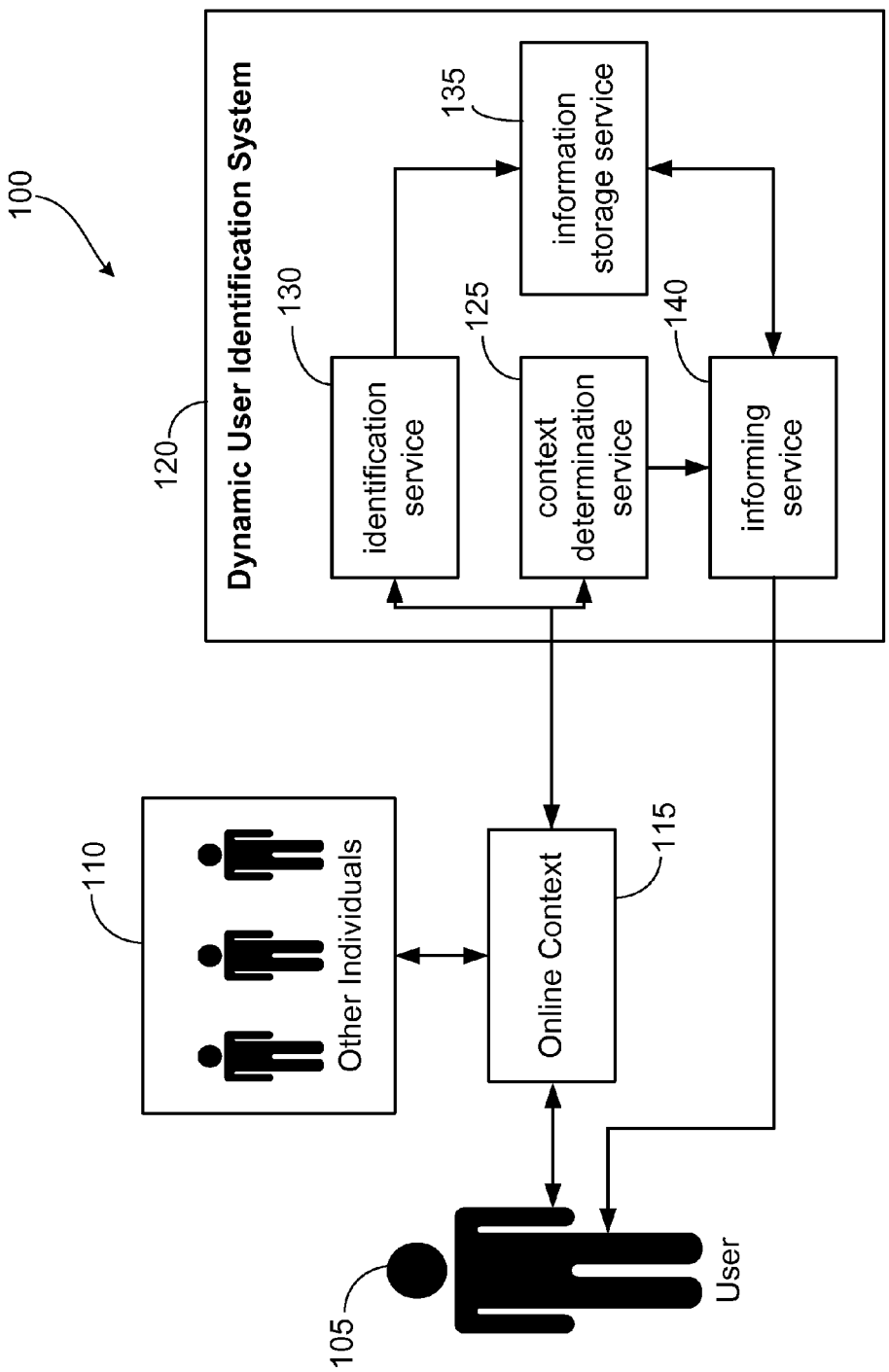
FIG. 1 is a schematic diagram of a system for dynamically identifying other users to an online user.

FIG. 1 shows a generalized system 100 used to identify dynamically to an online user 105 other individuals 110 within an online context 115 of the user 105. The system 100 identifies the other individuals 110 to the user 105 using a dynamic user identification system 120. The dynamic user identification system 120 is configured to be scalable and includes a context determination service 125, an identification service 130, an information storage service 135, and an informing service 140.

The context determination service 125 may be configured to determine the online context 115 of the user 105, and to communicate information indicative of the online context 115. The online context 115 may be based upon an online presence of the user 105, such as, for example, a presence of the user 105 at a particular URL (uniform resource locator), chat-room, message board, or newsgroup. The online context 115 also may be based upon a focus of the user 105 upon a particular web page or portion of a web page at which the user 105 is present. To facilitate the determination of the online context 115, various online locations and/or information sources may be aggregated, for example, by hierarchy or topic, and may be designated accordingly.

The identification service 130 may be configured to identify other individuals 110 present within the online context 115 of the user 105. The identification service 130 may include mechanisms to log entry within and exit from the online context 115 of the other individuals 110. The identification service 130 may employ one or more protocols to transfer information internally or to communicate with other components of the dynamic user identification system 120.

The information storage service 135 stores information (e.g., trait information, identification information, and/or contact information) indicative of the user and/or of the other individuals 110 identified as within the online context 115 of the user 105. For example, the information storage service 135 may store, in relation to the online context 115, information indicative of an other individual 110 indicated by the identification service 130 to have entered within the online context 115. Similarly, the information storage service 135 may remove from storage the information indicative of the individual 110 when the identification service 130 indicates that the other individual 110 has left the online context 115. Storing trait or other information of essentially only individuals presently within the online context 115 may improve scalability of the system 100.

The trait information of the other individuals 110 may include, for example, information indicative of an age, gender, nationality, race, disability and/or other demographic identifier of the individual, and/or information indicative of an expertise, interest, preference, education, profession, avocation, user type and/or other quality of the other individual 110. In the primary implementation described herein, the trait information does not include "heavy" items such as the extensive information associated with a history of the online activity or correspondence of the other individual 110. While "heavy" items may be stored and communicated as other information in a manner similar to that described for trait information, heavy information items are distinguished from trait information for purposes of this description to better explain one possible implementation in which the system 120 is not burdened and scalability is not impeded. Hence, the trait information is merely a subset of all other available information. The information storage service 135 may store the trait information, the identification information and/or the contact information or may store a reference used to access the information.

The informing service 140 uses the trait, identification, or contact information of the information storage service 135 to inform the user 105 of at least one of the other individuals 110 within the online context 115. The informing service 140 may be configured to identify the other individuals 110 to the user 105 in association with the online context 115. For example, the other individuals 110 may be identified in a pop-up window associated with a web page upon which the user 105 is focused. To provide a more focused and relevant disclosure, the informing service 140 may identify the other individuals 110 to the user 105 based on a common age grouping or other common demographic identifier. For example, the informing service 140 may inform a user 105 between the ages of 25 and 32 of other individuals 110 within the online context 115 who also are between the ages of 25 and 32 years.

The informing service 140 also may provide the user 105 with trait information indicating interests or characteristics of the other individuals 110, and may enable the user 105 easily to communicate with one or more of the other individuals 110 based on the identification and contact information. The informing service 140 may enable the user 105 to modify the presentation of information related to the other individuals 110 (e.g., to determine ordering of the information), to obtain related follow-on information, and/or to select or filter information based on various criteria (e.g., based on a postal code or a telephone area code).

The elements of system 100 (the system elements) may include additional mechanisms for delivering or processing data. The mechanisms may include, for example, any applications, protocols, devices, or networks used to facilitate communication or processing of electronic data. The system elements also may include or be included in a general-purpose or a special-purpose computer, a database, a local area network (LAN), and/or a wide area network (WAN). The response to and execution of instructions received by the system elements may be controlled by, for example, a program, a piece of code, an instruction, a device, a computer system, or a combination thereof, for independently or collectively instructing the system elements to interact and operate as described.

Figure 2:
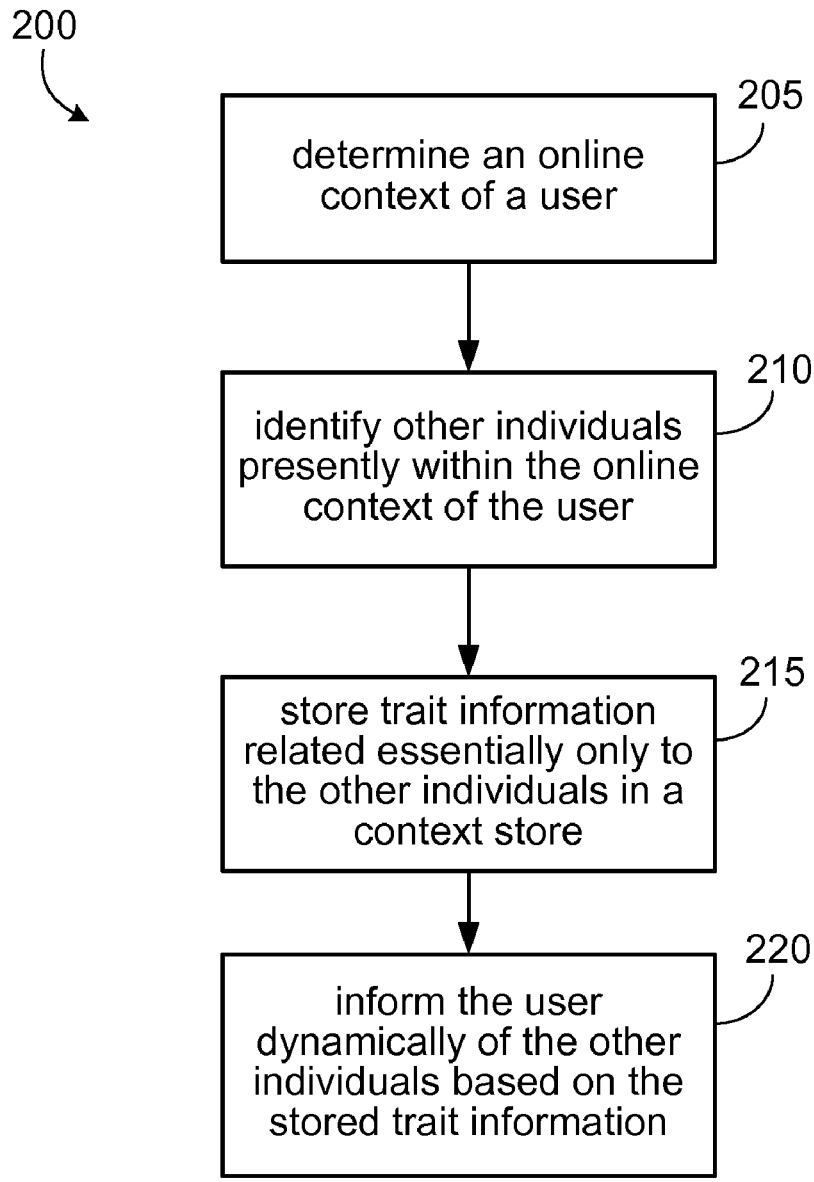
FIG. 2 is a flow diagram of a process implementable by the system of FIG. 1.

FIG. 2 illustrates a flow diagram of a process 200 implementable by system 100 of FIG. 1 to identify dynamically to the online user 105 at least one of the other individuals 110 within the online context 110. The context determination service 125 determines the online context 115 of the user 105 (step 205). To this end, the context determination service 125 may monitor the online activity of the user 105 and may determine the online context 115 based, for example, on a web page or portion of a web page presently visited and/or focused upon by the user 105.

The identification service 130 identifies one or more other individuals 110 within the online context 115 of the user 105 (step 210). For example, the identification service 130 may track the entry into and exit from the online context 115 of individuals to determine the other individuals 110 presently within the context 115.

The information storage service 135 stores trait information, identification information and/or contact information related essentially only to the other individuals 110 in a context store, such as, for example, a database record associated with the online context 115 (step 215).

Finally, the informing service 140 informs the user 105 dynamically of at least one of the other individuals 110 based on the stored trait, identification and/or contact information of the identification service 130 (step 220). The informing service 140 may inform the user 105 of the other individuals 110 using, for example, a pop-up window, a list, a graph, or any other appropriate mechanism. The informing service 140 may inform the user 105 of the other individuals 110 in a fashion associated with the online context 115 of the user 105 and may enable the user 105 to interact online with at least one of the other individuals 110 based on information of the information storage service 135.

Figure 3:
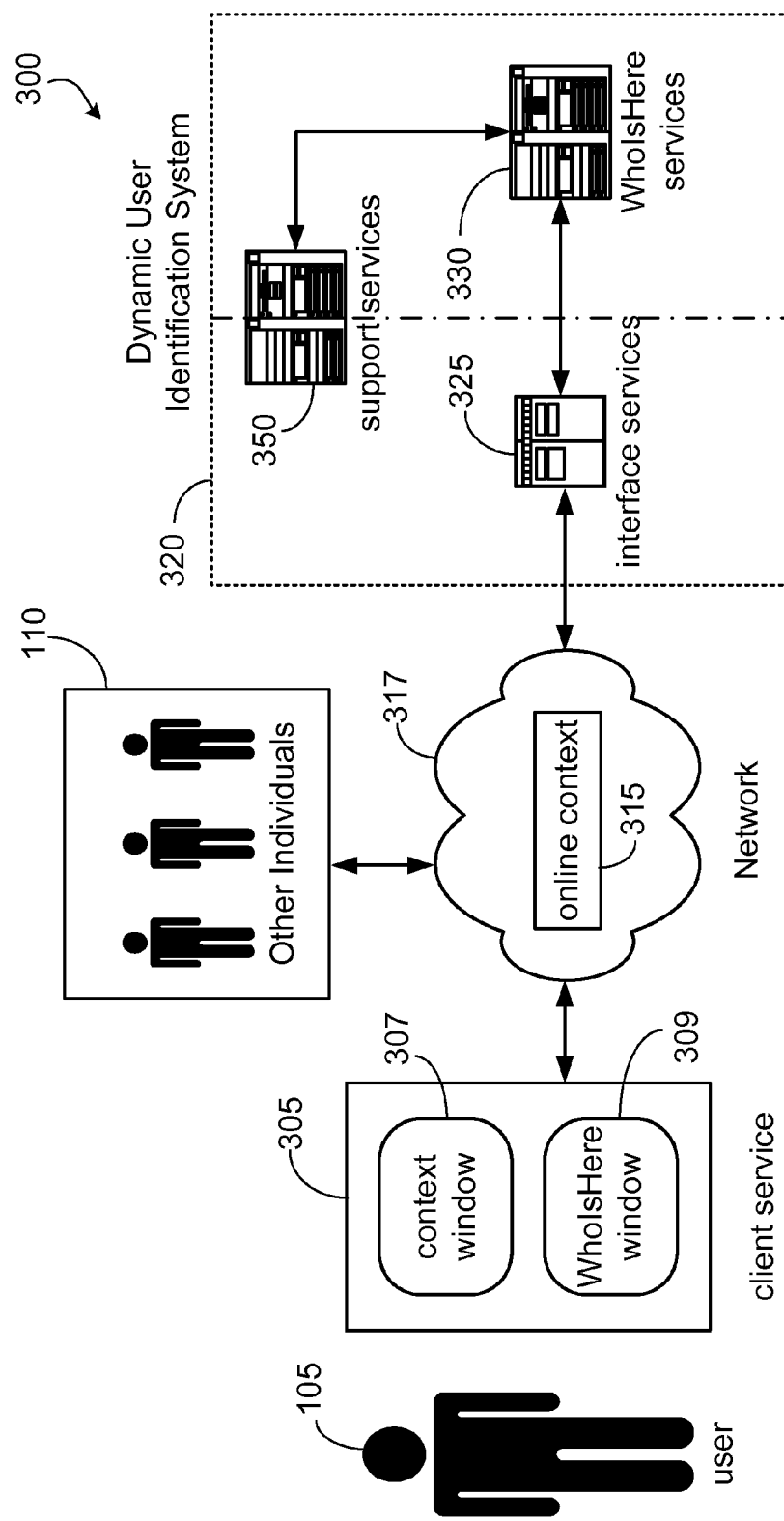
FIG. 3 is a schematic diagram of a user identification system.

Referring to FIG. 3, a generalized system 300 is illustrated that uses a dynamic user identification system 320 having a WhoIsHere service 330 to identify dynamically to the user 105 at a client service 305 at least one other individual 110 also within an online context 315 of a large scale network 317. Exemplary components of the notification system 300 are described in greater detail below.

The client service 305 may be configured to provide the user 105 with online access to the network 317 and may include a context window 307 associated with the online context 315 and a WhoIsHere window 309 associated with the WhoIsHere service 330. More generally, the client service 305 may include any device, system, and/or piece of code that relies on another service to perform an operation. For example, the client service 305 may include a device such as a notebook computer, a telephone, a pen-enabled computer, a personal digital assistant (PDA) or mobile telephone, and/or a desktop computer. The client service 305 also may include a Web browser, an email client, a synchronization client (e.g., a calendar synchronization client, or a task list synchronization client), an instant messaging (IM) client, a business productivity application (e.g., a word processor or a spreadsheet program), and/or an operating system or operating system kernel residing on a device. The client service 305 may be arranged to operate within or in concert with one or more other systems, such as, for example, one or more LANs and/or one or more WANs.

The client service 305 may receive and present information to the user 105 using a standard protocol, such as, for example, the standard generalized markup language (SGML), the extensible markup language (XML), the hypertext markup language (HTML), the extensible hypertext markup language (XHTML), the compact hypertext markup language (cHTML), the virtual reality markup language (VRML), the wireless markup language (WML), the voice extensible markup language (VXML), the short message service (SMS), a document object model (DOM), the simple object access protocol (SOAP), or the dynamic hypertext markup language (DHTML). The client service 305 may present the information to the user 105 in a manner that enables the user 105 to respond to, or to interact with, the presented information.

The large scale network 317 typically allows direct or indirect communication between the client service 305 and the dynamic user identification system 320, irrespective of physical or logical separation. Although not shown in FIG. 3, the large scale network 317 also may allow direct or indirect communication between the client service 305, the other individuals 110, and/or the support service 350. The large scale network 317 may access or include various sources of information, such as, for example, third party information or services, email, a discussion group, a chat room, a news service, a broker service, a banking service, a shopping service, a weather service, the World Wide Web, or other Internet information sources.

The large scale network 317 may employ one or more protocols (i.e., standards, formats, conventions, rules, and structures) to transfer information internally or deliver information to one or more users. The protocols may include, for example, the Internet protocol (IP), the transfer connection protocol (TCP), the hypertext transfer protocol (HTTP), the file transfer protocol (FTP), the user datagram protocol (UDP), the layer two tunneling protocol (L2TP) and/or the simple mail transfer protocol (SMTP). The large scale network 317 may include, for example, the Internet, the World Wide Web, a WAN, a LAN, analog or digital wired and wireless telephone networks (e.g., PSTN, ISDN, or xDSL), radio, television, cable, satellite, and/or any other delivery mechanism for carrying data. The network 317 may be secured or unsecured, public or private.

The online context 315 may be defined by context definition information of the WhoIsHere service 330 and/or by meta data of the online context 315 that itself defines in whole or in part a scope of the context 315. The WhoIsHere service 330 may include or may access context definition information that may define an online context based on a hierarchical relationship of online locations and/or user relationships. For example, the context definition information may indicate that the scope of the online context 315 includes an online news site and web pages hierarchically associated with that site, or that the scope of the online context 315 includes a television channel and programming associated with that channel. The context definition information also may indicate that the scope of the online context 315 is limited according to a language or a geographic access region. For example, the scope of the online context 315 may be limited to include only English version pages of a web site and to exclude individuals accessing the website from outside of a predetermined geographic region (e.g., outside of the metropolitan area of the user's residence). In addition, or in the alternative, web pages of the online news site may include a label or tag indicating that they are within the same online context.

The dynamic user identification system 320 may be configured to indicate the number of other individuals 110 within the online context 315 based on trait information (e.g., a participation preference, a common age, and/or a similar demographic identifier) of the user 105 and of the other individuals 110. The dynamic user identification system 320 may identify the online context 315 automatically based upon an intelligent process that correlates derived parameters (e.g., location, language and/or subject matter) of a URL to a related context definition. The dynamic user identification system 320 also may identify the online context 315 based, for example, on a meta tag embedded of the online context 315 that defines the online context 315. The dynamic user identification system 320 also may be configured to show online identifiers (e.g., screen names) of other individuals 110 within the context 315, and may present the online identifiers sorted according to commonality of interest with the user 105.

The user 105 and the other individuals 110 (collectively the users) each may specify certain trait information, such as, for example, participation preferences, to be used by the dynamic user identification system 320. For example, the users may choose to opt-in or opt-out of participation, and may be allowed to do so dynamically during an online session. When opted-in, users may see and be seen using the dynamic user identification system 320. Users also may specify to opt-in or to opt-out of participation on a context-by-context basis, according to categories of contexts, and/or based on trait information, such as, for example, an age or other demographic identifier. For example, users may opt-in or opt-out of some or all: 1) message boards, 2) web sites, and/or 3) chat rooms. Similarly, users may opt-in or opt-out with respect to other individual users and/or with respect to an age or other demographic identifier. For example, a user may opt-in with respect to one or more individuals with whom the user wishes to share presence information, or may opt-out with respect to a list of individuals by whom the user does not wish to be seen. Nevertheless, even when opted-out, a user's un-named presence within a context still contributes toward the aggregate count of individuals within that context. Additionally, certain classes of users automatically may be opted-out based on trait information, such as, for example, users classified as "Kids," or users classified as "Young Teens," or "Mature Teens" for whom a parental control setting indicates that participation is not permitted.

Subject to the participation preferences or other trait information, the dynamic user identification system 320 may enable the user 105 to interact online with one or more of the other individuals 110 within the online context 315, for example, by adding the other individual 110 to a contact list (e.g., a buddy list), or by using instant messaging or email. The dynamic user identification system 320 also may enable the user 105 to interact with one or more of the other individuals 110 using a voice communication provided, for example, using a wireless mobile device. The dynamic user identification system 320 may allow the user 105 to view a profile of the other individual 110 so that the user 105 may determine further the desirability of communicating with the other individual 110.

In one implementation, the dynamic user identification system 320 may work to identify the viewers of a television program. While the user 105 views the television program, the dynamic user identification system 320 may identify to the user 105 other viewers 110 presently viewing the same program and who also are included in a contact list (e.g., a buddy list) of the user 105 and/or who have similar or complementary trait information. The dynamic user identification system 320 may enable the user 105 to interact during the television program with one or more of the other individuals 110, using, for example, instant messaging and/or any other appropriate form of electronic messaging. The ability to interact dynamically and in real time with other viewers of a television program may significantly enhance the real and perceived value of television programming by aiding viewers to build communities of other individuals having common interests.

Moreover, certain television programming lends itself to viewer interaction, such as, for example, performance or reality based programming. In reality based programming the viewers generally select favorite participants, and may be enabled to participate in the program by voting. The interactivity provided by the dynamic user identification system 320 enables viewers of reality based programs to interact with each other regarding their favorite or most disliked reality program participants, or to organize voting blocks or other activities to further invest the viewers' role in and contribution to the reality program.

Based on the trait information, the dynamic user identification system 320 may distinguish visually user-rated experts whose expertise is relevant, for example, to the online context 315, or an interest of the user 105. For example, in a financial context, the dynamic user identification system 320 may distinguish visually an individual who is a financial expert; if the online context 315 relates to health, the dynamic user identification system 320 may distinguish as experts only those individuals having a health related expertise. In like manner, the dynamic user identification system 320 may distinguish visually other individuals based on other trait information, such as, for example, age or another demographic identifier. The dynamic user identification system 320 generally may include any device, system, and/or piece of code configured to perform an operation related to activity associated with the network 317 or requested by the client service 305.

The dynamic user identification system 320 includes a front-end 321 and a back-end 323. The front-end 321 and the back-end 323 may or may not be incorporated within the same hardware or software device, depending, for example, on an anticipated workload of the dynamic user identification system 320. Structuring the dynamic user identification system 320 to include front-end 321 and back-end 323 portions may improve the ability of the dynamic user identification system 320 to serve the many users of a large scale network such as the Internet. In other words, the front-end/back-end structure may improve the scalability of the dynamic user identification system 320.

Referring more specifically to the front-end 321, the front end may include one or more interface services 325. The interface services 325 may communicate online activity of the user 105 or of the other individuals 110 to one or more WhoIsHere services 330 or support services 350 of the back-end 323. The interface services 325 also may communicate service requests from the client service 305 to the back-end 323 and communicate information to the client 305 informing of one or more of the other individuals 110.

The interface services 325 of the front-end 321 communicate between the client services 305 and the WhoIsHere services 330. The interface services 325, for example, communicate information to the WhoIsHere services 330 identifying the online context 315 of the user 105. The interface services 325 may communicate to the WhoIsHere services 330 information based upon a current online location or online activity of the user 105. For example, the interface services 325 may communicate a context identifier (e.g., a meta tag) embedded in an information item accessed by the user 105. The interface services 325 also communicate to the user 105 information informing of the other individuals 110 as determined by the WhoIsHere services 330. The interface services 325 may include a print service, a file access service, an IM service, an operating system, an operating system kernel, an authentication service, an authorization service, and/or any combination of these or other services.

In an alternative implementation, the interface services 325 may be included in whole or in part as a component of the client service 305.

The back-end 323 includes one or more WhoIsHere services 330 that determine the other individuals 110 presently within the online context 315 and are configured to inform the user 105 of at least one of the other individuals 110. One or more support services 350 are configured, for example, to communicate information to the WhoIsHere service 330 indicative of online activity and/or preferences of the other individuals 110. The WhoIsHere services 330 and the support services 350 each are described in greater detail below.

The WhoIsHere services 330 communicate trait, identification and/or contact information of the other individuals 110 to the interface services 325 for suggestion to the user 105 through the client service 305. The WhoIsHere services 330 determine the other individuals within the online context 315 and inform the user 105 of at least one of the other individuals 110. The WhoIsHere services 330 may be configured to receive information indicating the current online context of the user 105 from the interface services 325.

The WhoIsHere services 330 may communicate to the interface services 325 a WhoIsHere list of other individuals 110 within the online context of the user 105. The WhoIsHere services 330 may communicate the WhoIsHere list to the interface services 325 automatically after a change in the online context of the user 105 and also at any time that the WhoIsHere list changes. The WhoIsHere services 330 also may communicate the WhoIsHere list to the interface services 325 at short periodic intervals, such as, for example, every 30 or 60 seconds. Alternatively or in addition, the WhoIsHere services 330 may communicate the WhoIsHere list to the interface services 325 in response to a request of the interface services 325. The interface services 325 may be configured to request from the WhoIsHere services 330 an updated WhoIsHere list at set periodic intervals or upon a change in the online context of the user 105.

The WhoIsHere services 330, alone or in conjunction with other services, may perform sorting, prioritizing, or other types of organizational processing on the trait, identification and/or contact information underlying the WhoIsHere list so that the WhoIsHere list is provided in a desired fashion. Typically, the WhoIsHere services 330 will include a software program or a piece of code to cause the WhoIsHere services 330 to operate as described above.

The support services 350 are configured, for example, to communicate with the WhoIsHere service 330 and to provide the WhoIsHere service with information related to the other individuals 110. The network 317 includes one or more online contexts. In general, the support services 350 determine dynamically the online contexts and online locations that each of the other individuals 110 access (e.g., by opening a Web page of the network 317), and/or upon which they focus (e.g., by clicking on an open Web page or a portion thereof). To make this determination, the support services 350 may monitor dynamically the online activities of the other individuals 110 and/or may communicate with client services of the other individuals 110 to obtain relevant activity information. The support services 350 also may determine trait information (e.g., information of an interest, a preference, or an expertise), identification information and/or contact information of each of the other individuals 110. The support service 350 may determine this information by communicating with the other individuals 110, through online activity of the other individuals 110, and/or through the use of user profiles describing the other individuals 110.

Having determined information related to online activity of one or more of the other individuals 110, the support services 350 may communicate that information to the WhoIsHere services 330. The WhoIsHere services 330 include records representative of various online contexts of the network 317. The WhoIsHere services 330 record information related to online activity communicated by the support services 350 using the records representative of the online contexts. For example, the WhoIsHere services 330 may include a record for online context A, and may add to an internal list trait, identification and/or contact information of an individual who has accessed or focused upon a web page within online context A. The WhoIsHere services 330 may remove the individual from the internal list, for example, upon receipt of information indicating that the individual has exited online context A by closing the web page within context A or by logging out. For individuals who are opted-out or who are globally excluded, the WhoIsHere services 330 may store only anonymous presence information for contribution to a total presence count of the online context 315.

Each of the client service 305, the network 317, and the dynamic user identification system 320 may include further mechanisms for delivering data, such as, for example, the short message service (SMS), the wireless application protocol (WAP), the transport connection protocol (TCP), the Internet protocol (1P), the World Wide Web, one or more LANs, and/or one or more WANs. The client service 305, the network 317, and the dynamic user identification system 320 also may include analog or digital wired and wireless telephone networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying data.

One or more other services may be included in the components of system 300 and/or these components (hereinafter the system services) may be included as part of one or more other services. For example, the system services may include or be included in a general-purpose or a special-purpose computer (e.g., a personal computer, a PDA, or a device specifically programmed to perform certain tasks), a local area network, and/or a wide area network. In either case, the response to and execution of instructions received by any or all of the system services may be controlled by, for example, a program, a piece of code, an instruction, a device, a computer system, or a combination thereof, for independently or collectively instructing the services to interact and operate as described herein.

Figure 4:
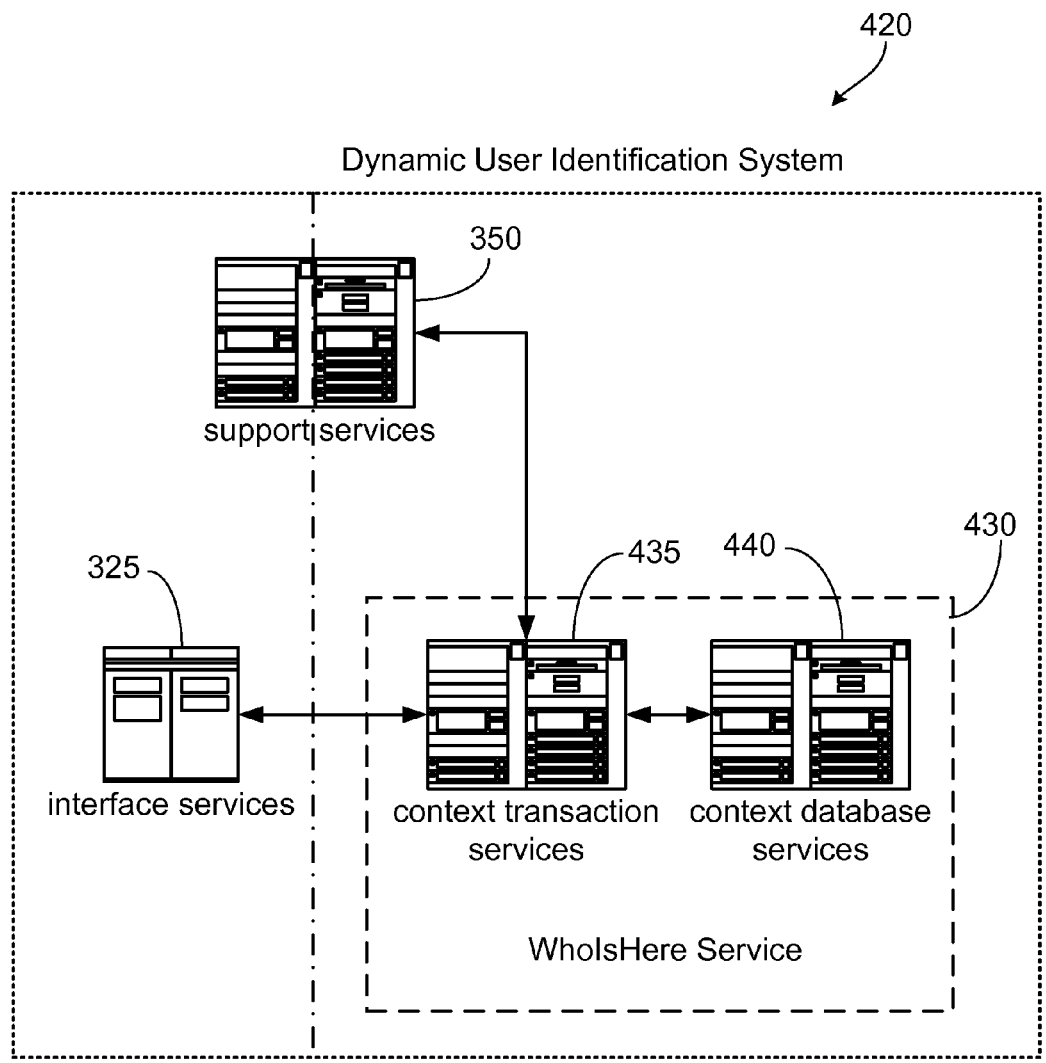
FIG. 4 is a schematic diagram of a WhoIsHere service that may be used to implement the user identification system of FIG. 3.

FIG. 4 illustrates a dynamic user identification system 420 that includes a WhoIsHere service 430 implemented using one or more context transaction services 435 and one or more context database services 440. Each context database service 440 may be configured to communicate with every context transaction service 435 and with every other context database service 440. The context transaction services 435 and the context database services 440 may or may not be incorporated within the same hardware and/or software device, depending, for example, on an anticipated workload of the WhoIsHere service 430. Structuring the WhoIsHere service 430 to include a separable context transaction services 435 and context database services 440 may improve the scalability of the WhoIsHere service 430.

The context transaction services 435 may determine information indicative of online presence and may communicate that information with the context database services 440. The context database services 440 may maintain a list of individuals presently within the online context 315 based on the information indicative of online presence communicated by the context transaction services 435. In general, the information indicative of online presence includes information, such as, for example, an indication that a URL has been accessed by an individual or departed by an individual. The context transaction services 435 may indicate presence information for only a first presence of an individual who is multiply present within the online context 315. For example, if an individual has open simultaneously three instances of the same web page, the context transaction services 435 may indicate to the context database services 440 only one of those presences (e.g., the first presence). Alternatively, the context database services 440 may receive indication of each presence and itself may filter out instances of redundant presence.

The context transaction services 435 also may obtain from the support service 350 trait information related to an individual. The trait information may include preference and/or privacy information associated with the individual, such as, for example, information indicative of a participation status, an instant messaging (IM) visibility preference, an IM status (e.g., an active status, an idle time, an away status, and/or a mobile status), a user class (e.g., "Kids," "Young Teen," "Mature Teen," or "General"), and/or a parental control (e.g., allowed or disallowed).

The trait information also may include information indicative of an interest, expertise, age or other demographic identifier of the individual. The trait information indicative of interest, expertise, or age may be associated with one or more categories. In one implementation subject matter or demographic categories are used including, for example, Autos, Careers and Work, Computing Center, Entertainment, Games, Health, House and Home, Internal, International, Kids Only, Live, Local, Men, Music, Network Programming, News, Parenting, People Connection, Personal Finance, Relationships, Research and Learning, Rewards, Senior Living, Shopping, Sports, Teens, Travel, Welcome, What's New, Women, Workplace, and Miscellaneous. Categories also may be based upon a relevant geography or a language. The categories may be predetermined or they may be determined dynamically based on an intelligent process.

The online context 315 also may be associated with a category. For example, the online context 315 may include a corresponding category identifier (e.g., a meta tag) embedded in a location of the online context 315. Alternatively, the context transaction services 435 may categorize the online context 315 automatically based upon an intelligent process to correlate the online context 315 to a most closely matching category. The context transaction services 435 also may be configured to generate dynamically one or more additional categories if already existing categories do not adequately describe one or more online contexts of importance. The context transaction services 435 may coordinate categorization with the support services 350.

The context database services 440 may include a database, such as, for example, a relational database, for storing or referencing trait, identification and/or contact information associated with the individuals identified to be present within the online context 315. The trait information, for example, may include or be derived from an individual profile, WhoIsHere participation information, and/or individual location information.

The context database services 440 use the information indicative of presence communicated by the context transaction services 435 to maintain a context record of individuals present within the online context 315. To improve scalability, the context database services 440 may include in each context record essentially only information related to individuals presently within the online context associated with the context record.

In one implementation, the context database services 440 store information within the context record indicative of an individual based on a communication of the context transaction services 435 that the individual has opened a web page within the online context 315. Similarly, the context database services 440 may remove from the context record the information indicative of the individual 110 when the context transaction services 435 communicate that the individual 110 has closed the web page within the online context 315.

The context database services 440 may indicate that certain individuals listed are excluded globally from WhoIsHere participation based on information communicated by the context transaction services 435. For example, an individual may be indicated as globally excluded based on trait information indicating that the individual is not opted into WhoIsHere, that the individual is categorized as a "Kid," "Young Teen," or a "Mature Teen" for whom a parental control prohibits participation. To prevent lurking (e.g., observing others without being observed), an individual also may be indicated as globally excluded who, although opted into WhoIsHere, indicates a preference to remain invisible to other WhoIsHere participants.

The context database services 440 may communicate to the context transaction services 435 a list of individuals within the online context 315. The context transaction services 435 may cache the list of individuals to reduce communication with the context database services 440. The context database services 440 may compose the list from the information stored in the context record based on preference information or other trait information of the requesting user 105. For example, the user 105 may prefer that the list of individuals 110 present within the context 315 be sorted according to a relevant expertise or a commonality of interest with the requesting user 105. The commonality of interest may include a direct interest match between the user 105 and an other individual 110, or an indirect interest match between the user 105 and an individual selected as an associate by the other individual 110 (e.g., by listing the individual to a contact list).

For individuals not indicated as globally excluded, the context database services 440 may indicate in the list trait, identification and/or contact information of those individuals. Otherwise, for an individual indicated as globally excluded, the context database services 440 indicate the presence of that individual generically by incorporating their presence only in a count of total users within the context 315. To the extent that a particular individual 110 has indicated a desire to exclude themselves from visibility to the user 105, that individual 110 will not be identified on the list. In any event, the context database services 440 may provide the list automatically to the context transaction services 435 at certain periods or in response to a request of the context transaction services 435.

The online context 315 may experience periods of high use that may cause a server of the context database services 440 or the context record of the context database services 440 to exceed a usage threshold value. To redistribute the load in response to the exceeded usage threshold value, the context record of the context database services 440 may be migrated to another server of the context database services 440 that is less busy. Where the usage threshold value exceeded is associated particularly with the context record, the context record may be divided between one or more servers of the context database services 440. Should the activity associated with the divided context record fall sufficiently, the context record may be unified again upon a single server of the context database services 440. Migration, division, or unification of a context record may be performed automatically. Information indicative of any migration, division, or unification of the context record may be communicated to the context transaction services 435.

Figure 5:
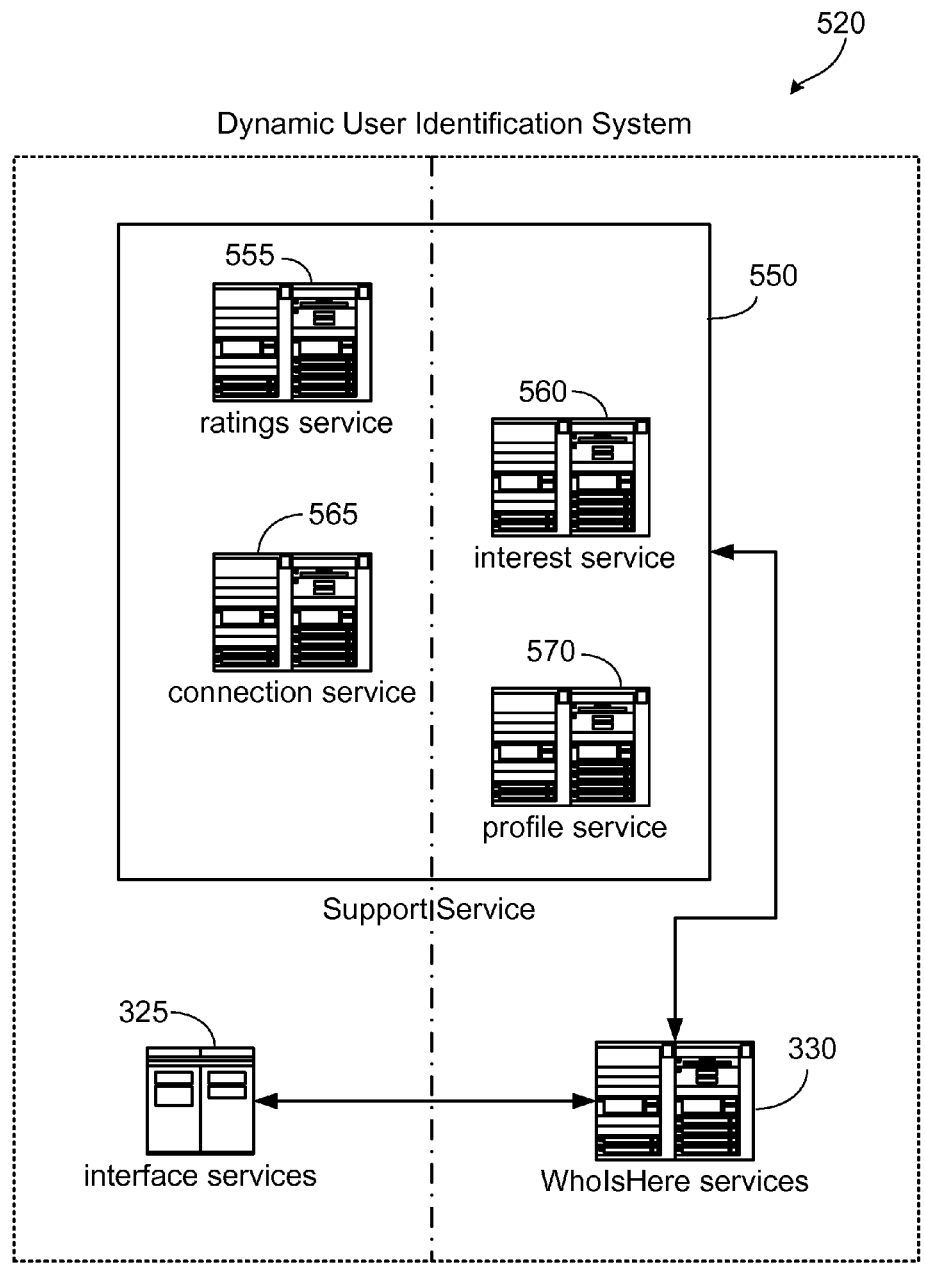
FIG. 5 is a schematic diagram of a support service that may be used to implement the user identification system of FIG. 3.

FIG. 5 illustrates a dynamic user identification system 520 that includes a support service 550 implemented using a rating service 555, an interest service 560, a connection service 565, and a profile service 570. The rating service 555 may be configured to determine and/or identify a rated expertise of one or more individual users. The rating service 555 may determine and store expertise ratings for individual users based on predetermined expertise categories, such as, for example, the subject matter categories previously described. The rating service 555 may be configured to communicate an expertise rating of an individual user based on a request of the WhoIsHere service 330.

The interest service 560 may be configured to record interest information of one or more individual users. The interest service 560 also may be configured to communicate an interest message based on a request of the WhoIsHere service 330. The interest message may include interest information of an individual user and interest information of designated contacts (e.g., buddies) of the individual user.

The connection service 565 may be configured to provide or manage access to the network 317 by one or more individual users. The connection service 565, for example, may be configured to manage user logins and/or IM access. The connection service may be configured to determine and provide information indicative of a users online status or IM status, such as, for example, whether the user is active, idle, away, or logged-out.

The profile service 570 may be configured to manage profile information including trait, identification and/or contact information related to one or more individual users. The profile information may include, for example, client addressing information, location information, age or other demographic information, WhoIsHere participation information, general visibility information, user status information, user class information, and/or communication preferences related to an individual user. The profile information may be provided by an individual user and/or may be determined automatically, for example, based on online activity of the individual user. The profile service 570 may be configured to update profile information based on information communicated by the WhoIsHere service 330 and to communicate requested profile information to the WhoIsHere service 330.

The different services of the support services 550 also may access or include various sources of information, such as, for example, third party information or services, email, a discussion group, a chat room, a news service, a broker service, a banking service, a shopping service, a weather service, the World Wide Web, or other Internet information sources. The different services of the support service 550 may employ one or more protocols (i.e., standards, formats, conventions, rules, and structures) to transfer information internally or deliver information to one or more users. Protocols employed by the support service 550 may include, the Internet protocol (IP), the transfer connection protocol (TCP), the hypertext, transfer protocol (HTTP), the file transfer protocol (FTP), the user datagram protocol (UDP), the layer two tunneling protocol (L2TP) and/or the simple mail transfer protocol (SMTP).

Each of the various services of the support service 550 themselves may include front-end and back-end services. For example, the services may include a front-end interface service configured to interface with individual users or with other services or devices. The services also may include back-end processing and/or database services configured to interact and respond according to communications of the front-end services.

FIG. 6 illustrates an exemplary WhoIsHere window 600 that may be used by the system of FIG. 3 to identify one or more other individuals 110 to the online user 105. The WhoIsHere window 600 indicates a Sports:NFL context 605 associated with the window 600. The window provides a total count (491) 610 of the other individuals 110 within the Sports:NFL context 605. The window 600 also indicates the number of individuals (2) 615 within the Sports:NFL context 605 who are NFL experts, and the number of other individuals (112) 620 within the context 605 whose interests match a specified interest of the user 105.

A presentation selector 625 enables the user 105 to select a preferred presentation of one or more of the other individuals 110. The presentation selector 625, for example, may enable the user 105 to show experts first (as shown), to show interest matches first, or to list the other individuals 110 alphabetically.

The WhoIsHere window 600 also includes a display panel 630 used to show identifiers of one or more of the other individuals 110. Online identifiers for one or more of the individuals included in the total count 610 are displayed by the display panel 630. In this example, the two experts, InternetAnne and ChattingChuck, are displayed first according to the user preference indicated by the presentation selector 625. Starburst symbols in the leftmost column provide a graphical indication of the expert status of InternetAnne and ChattingChuck. In addition to an online identifier, each displayed individual also has an associated graphical icon that may, for example, communicate an identity, interest or expertise of the user. Commonality of interest (e.g., an interest match) between the user 105 and a displayed individual 110 is indicated visually by highlighting the row or online identifier of the matching individual. For example, the highlighted rows of InternetAnne and SurfingDiane indicate an interest match for each. Although not shown, color may be used to provide additional indication of expertise and/or commonality of interest, age or other demographic identifier.

The WhoIsHere window 600 may enable the user 105 to open an IM or email to an other individual who is displayed by clicking on the displayed identifier of that other individual. For example, the user 105 may initiate an IM to SurfingSally by clicking on that individual's online identifier. Alternatively, the user 105 may select SurfingSally and may click on the Buddy Info button 635 to view buddy information related to SurfingSally.

The WhoIsHere window 600 also includes a check-box 640 allowing the user 105 easily to opt-in or opt-out of WhoIsHere. As illustrated, the user 105 has opted into WhoIsHere by checking the check-box 640 to allow the user 105 to see and be seen.

Figure 7:
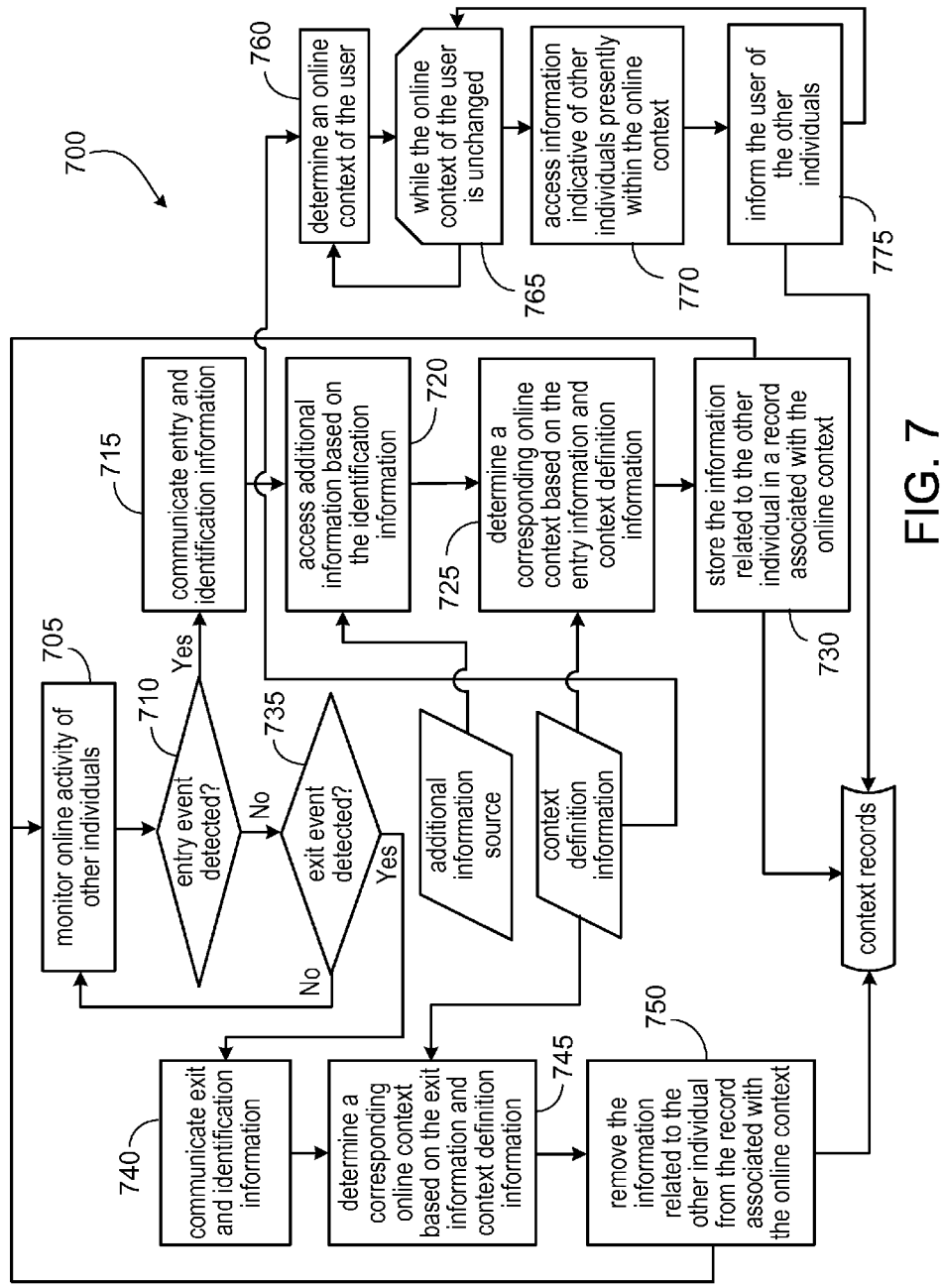
FIG. 7 is a flow diagram illustrating an exemplary process implementable by the user identification system of FIG. 3.

FIG. 7 illustrates a method 700 implementable by the dynamic user identification system of FIG. 3. The method 700 includes back-end steps used to determine other individuals within an online context of the user to be identified to the user, and front-end steps used to identify the other individuals to the user based on the online context of the user. The back-end and front-end steps may be performed asynchronously and/or concurrently to each other.

Referring to the back-end steps, online activity of other individuals is monitored (step 705). If an entry event (e.g. an open event, a focus event) is detected (step 710), then entry event and identification information is communicated (step 715). Additional information, such as, for example, trait and/or contact information of the other individual is accessed from an additional information source (e.g., a user profile database) based on the identification information (step 720). The additional information may include, for example, client addressing information, email information, interest information, age or other demographic information, and/or a WhoIsHere preference such as a participation status. A corresponding online context is determined based on the entry event information and context definition information (step 725). The information related to the other individual is stored and/or associated with a context record associated with the determined context (step 730). Monitoring of the online activity of the other individuals continues (step 705).

If an exit event is detected (step 735) rather than an entry event (step 710), then exit event and identification information is communicated (step 740). A corresponding online context is determined based on the exit event information and context definition information (step 745). The information related to the other individual is removed and/or disassociated from the context record associated with the determined context (step 750). Monitoring of the online activity of the other users continues (step 705).

Multiple back-end steps may be performed concurrently.

Referring to the front-end steps, an online context of a user 105 is determined based on online activity of the user 105 and context definition information (step 760). The online context of the user is monitored for change (step 765), and while the online context remains unchanged, information indicative of other individuals presently within the online context is accessed (step 770). The user then is informed of one or more of the other individuals based, for example, on preference or other trait information of the user and/or of the other individuals (step 775). To the extent that a change to the online context of the user is detected (step 765), the new online context is determined and the front-end steps are repeated. Multiple front-end steps may be performed concurrently.

Figure 8:
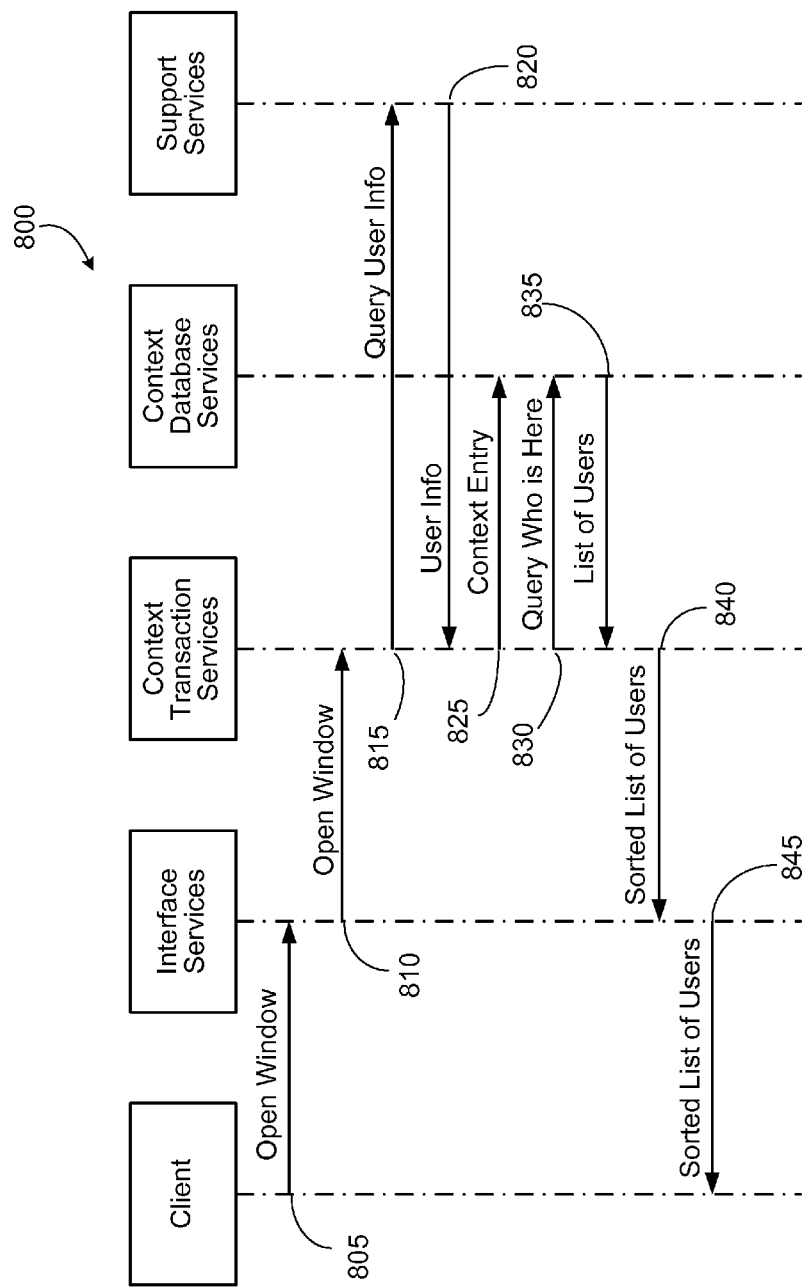
FIGS. 8-10 are transaction diagrams illustrating additional exemplary processes implementable by the user identification system of FIG. 3.
Figure 9:
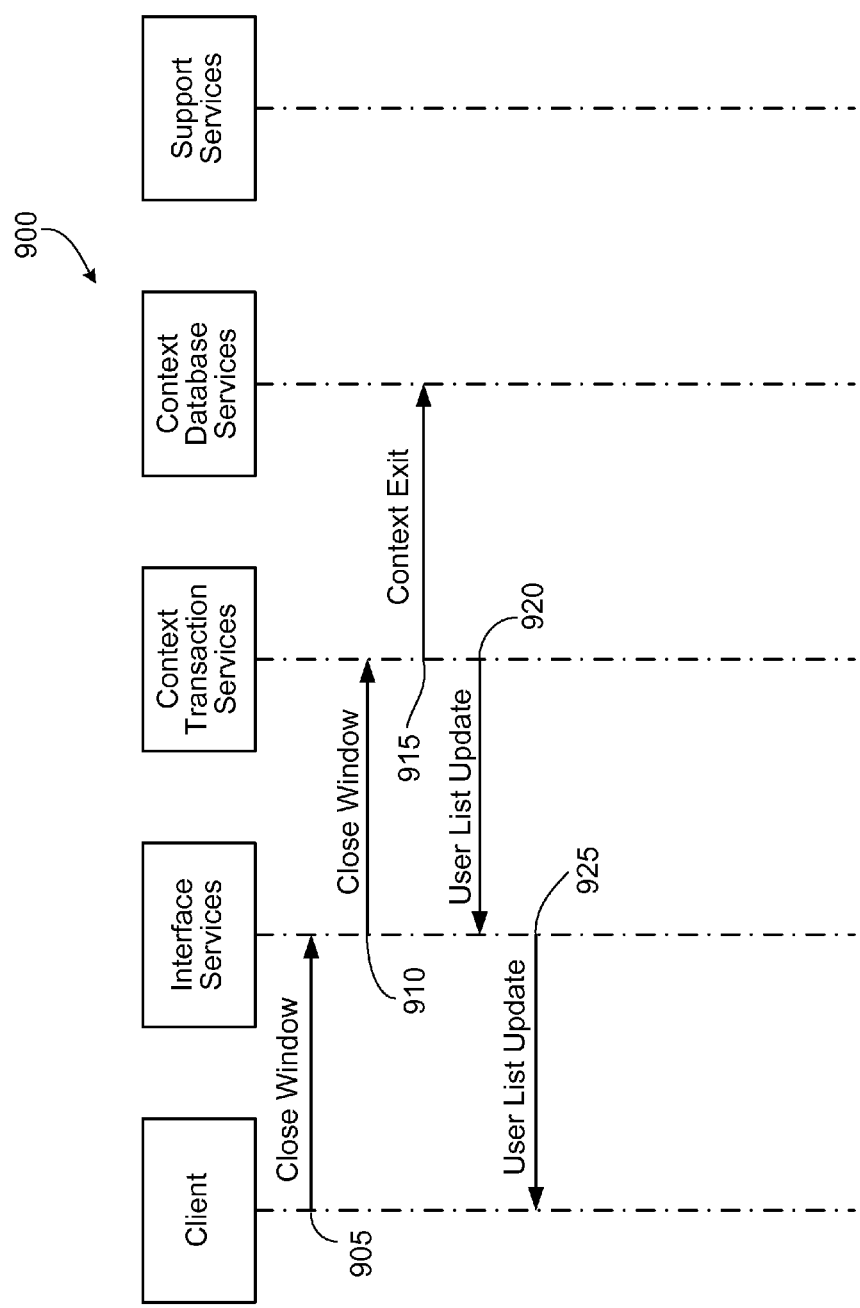
Figure 10:
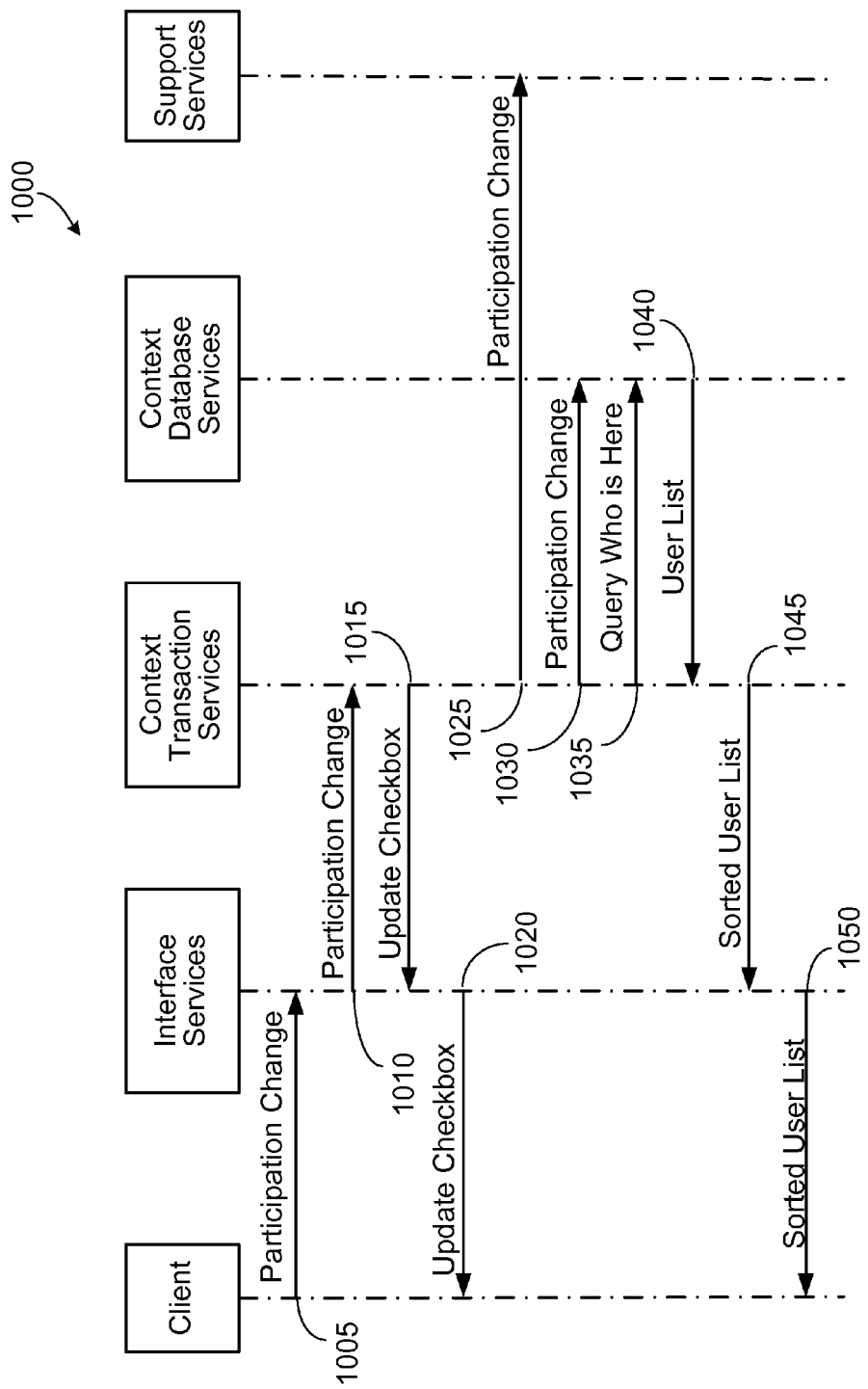

FIGS. 8-10 illustrate data flow diagrams showing processes that may be used to implement the system of FIG. 3.

FIG. 8 illustrates a process 800 that may be used to implement the system of FIG. 3 when the user opens a window, for example, to a web page. Upon opening a window to a web page for the user, the client communicates an "open window" message to the interface services (step 805). The interface services communicate the "open window" message to the context transaction services (step 810). Based on the "open window" message, the context transaction services issue a "query user info" message to the support services (step 815). The support services respond to the "query user info" message by passing a "user info" message to the context transaction services (step 820).

The context transaction services generate a "context entry" message based on the "open window" message and the "user info" message and communicate the "context entry" message to the context database services to indicate the presence of the user within the context (step 825). The context transaction services also communicate a "query who is here" message to the context database services (step 830). The context database services generate a "list of users" message identifying individuals within the context in response to the "query who is here" message (step 835). The context database services communicate the "list of users" message to the context transaction services (step 835). The context transaction services generate a "sorted list of users" message based on the "list of users" message and preferences of the user and communicates the "sorted list of users" message to the interface services (step 840). The interface services communicate the "sorted list of users" message to the client for presentation to the user (step 845).

FIG. 9 illustrates a process 900 that may be used to implement the system of FIG. 3 when the user closes a window, for example, to a web page. Upon closing a window to a web page for the user, the client communicates a "close window" message to the interface services (step 905). The interface services communicate the "close window" message to the context transaction services (step 910). The context transaction services communicate a "context exit" message to the context database services based on the "close window" message (step 915).

In response, and to the extent that the user does not have open other windows within the context, the context database services remove the user from the list of users within the context. The context transaction services generate a "user list update" message (step 920). The "user list update" message may indicate individuals present within another online context of the user and may be based on information cached by the context transaction services, or upon information queried from the context database services as shown in FIG. 7. The context transaction services communicate the "user list update" message to the interface services (step 920). The interface services communicate the "user list update" message to the client for presentation to the user (step 925).

FIG. 10 illustrates a process 1000 that may be used to implement the system of FIG. 3 when the user alters a participation preference while within an online context. When the user alters a participation preference (e.g., by checking an Opt-In check-box), the client communicates a "participation change" message to the interface services (step 1005). The interface services communicate the "participation change" message to the context transaction services (step 1010).

In response, the context transaction services communicate an "update check-box" message to the interface services (step 1015), which communicates the "update check-box" message to the client (step 1020). The context transaction services communicate a "participation change" message to the support services so that the support services may update stored preferences of the user (step 1025). The context transaction services also communicate a "participation change" message to the context database services (step 1030). The context transaction services modify trait information related to the user to reflect the changed participation status of the user.

Subsequently, the context transaction services communicate a "query who is here" message to the context database services (step 1035). Based upon the changed participation status of the user, the context database services generate a "user list" message based on the "query who is here" message. The context database services communicate the "user list" message to the context transaction services (step 1040). The context transaction services generate a "sorted list of users" message based on the "list of users" message and preferences of the user and communicates the "sorted list of users" message to the interface service (step 1045). The interface services communicate the "sorted list of users" message to the client for presentation to the user (step 1050).

Figure 11:
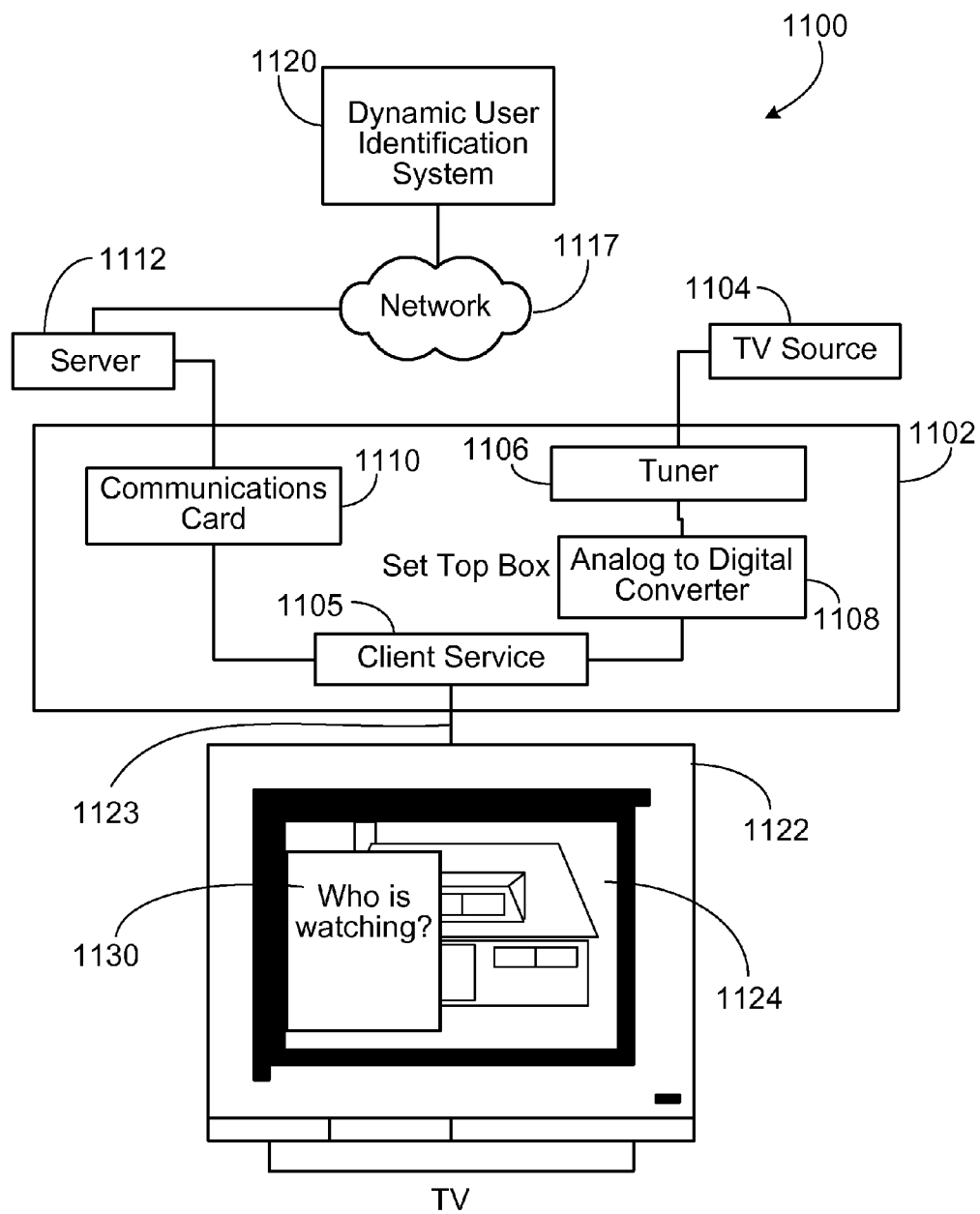
FIG. 11 is a schematic diagram of a system for dynamically identifying other viewers of a television program to an online viewer.

FIG. 11 illustrates a system 1100 used to identify dynamically to an online viewer of a television program other individuals viewing or otherwise tuning to the same television program. The system 1100 includes a set-top box 1102 that receives television signals from a television source 1104. The set-top box 1102 includes a tuner 1106 used to select a television channel for viewing. The selected television channel may be received as an unencoded or encoded digital or analog signal. For example, satellite television channels are typically received as a digital signal while most cable television channels are received as analog signals. The analog signals may be scrambled, and the digital signals may be encrypted and/or compressed (e.g., using MPEG-2 format). The set-top box 1102 includes an analog-to-digital converter 1108 (A/D converter) that permits digital processing of the television images regardless of the television source 1104. The A/D converter 1108 may also be configured to decode and uncompress a scrambled or encrypted signal.

The set-top box 1102 includes a network communication card 1110 configured to enable the set-top box to communicate with a network server 1112. The network server 1112 is configured to provide the set-top box 1102 with access to a network 1117. The network server 1112 may be, for example, an Internet Service Provider. The network 1117 enables direct or indirect communication between the set-top box 1102 and a user identification system 1120 through the network server 1112. The set-top box 1102 also includes a client service 1105 for communicating with the user identification system 1120 (the channel between the client service 1105 and the user identification system 1120 is not shown) and constructing a display on a television or monitor 1122. The client service 1105 may be, for example, a browser client software configured to communicate with the network server 1112 by sending HTTP (HyperText Transfer Protocol) messages.

The client service 1105 and the network 1117 are described broadly above with respect to FIG. 3, and the dynamic user identification system 1120 is described broadly above with respect to FIGS. 1 and 3-5. In particular, the client service 1105, the network 1117 and the dynamic user identification system 1120 typically have attributes comparable to and may illustrate one possible implementation of the client service 305, the large scale network 317, and the dynamic user identification systems 120, 320, 420, and 520, respectively. The dynamic user identification system 1120 may include interface services, support services, context transaction services, and context database services similar to those described previously with respect to FIGS. 3-5.

The client service 1105 is configured to construct a display that may include information received from the dynamic user identification system 1120 and/or from the television source 1104. The client service 1105 sends the constructed display to the television or monitor 1122 via an output port 1123. The client service 1105 is also configured to send channel selection data to the user identification system 1120 via the network server 1112.

In one implementation, the client service 1105 integrates information received from the user identification system 1120 and the television information by processing an HTML-like (Hypertext Manipulation Language) tag (e.g., <IMG SRC="TV" x=0, y=0>) that instructs the client service 1105 to place incoming television images on the screen at specific coordinates. The user identification system 1120 may send information to the set-top box 1102 as a web-page, and by modifying the received web-page to include this tag, the client service 1105 may display the television information received from the television source 1104 in conjunction with the information received from the user identification system 1120. Alterations to the screen, such as adding user interface controls or moving and/or resizing the television image also may be performed by altering the instructions of a web-page displayed by the client service 1105. The set-top box 1102 may store a default web-page that makes the received television signal a full-screen background image 1124 with overlaid WhoIsWatching window 1130.

Figure 12:
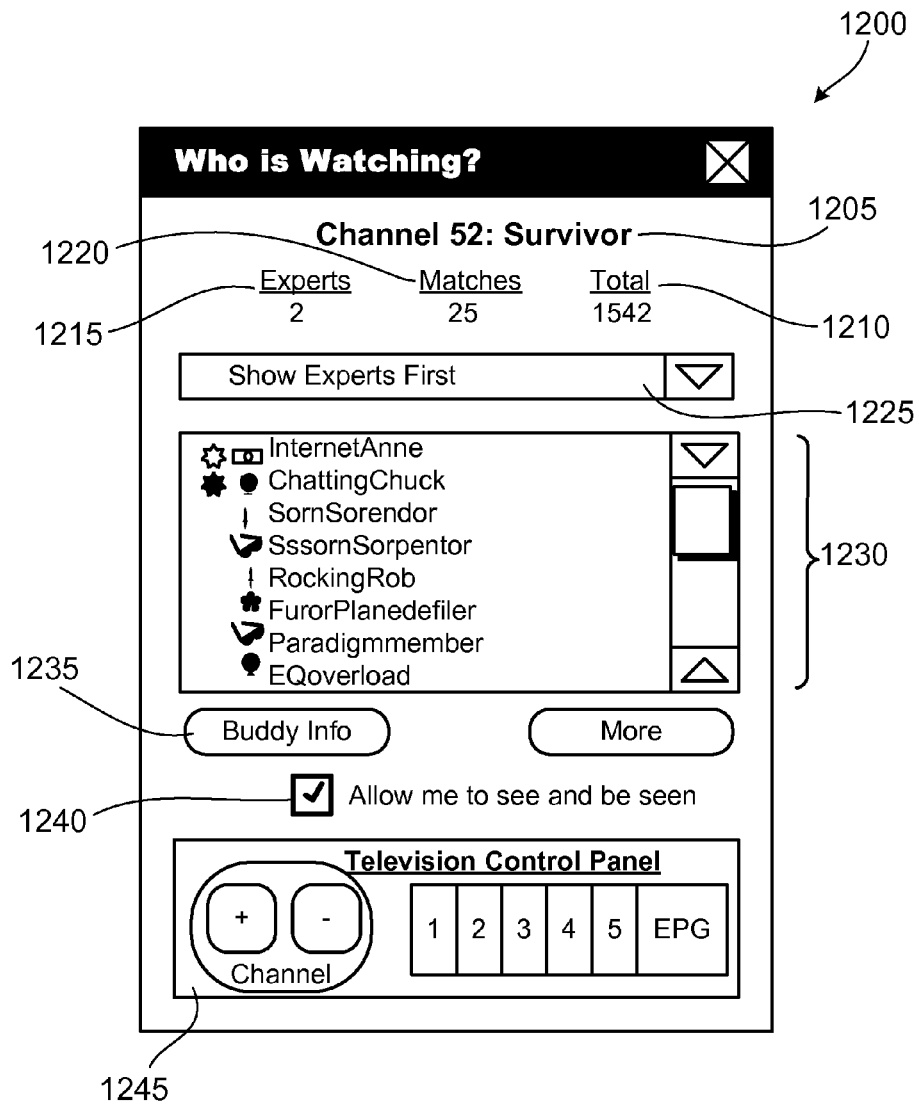
FIG. 12 illustrates an exemplary window that may be used by the system of FIG. 11 to identify other viewers to an online viewer.

FIG. 12 illustrates an exemplary WhoIsWatching window 1200 that may be used by the system of FIG. 11 to identify one or more other viewers to a viewer of a program presented by the television or monitor 1122. The WhoIsWatching window 1200 has attributes comparable to and may illustrate one possible implementation of the WhoIsHere window 600 of FIG. 6.

The window 1200 indicates a program (or channel or television network) 1205 to which the television or monitor 1122 is currently tuned (e.g., "Channel 52: Survivor"). The window 1200 provides a total count 1210 of the other viewers that are tuned to the program 1205 (e.g., "1542"). The window 1200 also indicates the number 1215 of other viewers tuned to the program 1205 that are considered experts with respect to the program (e.g., "2") and the number 1220 of other viewers tuned to the program 1205 whose interests match a specified interest of the viewer (e.g., "25").

A presentation selector 1225 corresponds to the presentation selector 625 of FIG. 6 and enables the viewer to select a preferred presentation of one or more of the other viewers (e.g., experts first, interest matches first, or alphabetically). The display panel 1230 corresponds to the display panel 630 and is used to show online identifiers of one or more of the other viewers. Online identifiers included in the total count 1210 are displayed in the display panel 1230. A starburst symbol in the leftmost column may denote an online identifier belonging to an expert viewer. Icons associated with each online identifier may communicate, for example, an identity, interest, or expertise of the other viewer. Highlighting a row or online identifier may indicate visually an other viewer that has a matching interest with the viewer.

The WhoIsWatching window 1200 may enable the viewer to open an IM or e-mail that may be sent to an other viewer by, for example, selecting the displayed identifier of that other viewer. The viewer also may select the displayed identifier and then select the Buddy Info button 1235 to view buddy information of the other viewer corresponding to the displayed identifier. The WhoIsWatching window 1200 also includes a checkbox 1240 that enables the viewer to opt-in or opt-out of WhoIsWatching. For example, by checking the checkbox 1240, the viewer has opted into WhoIsWatching and is able to see other viewers and be seen by other viewers.

The WhoIsWatching window 1200 also may include a television control panel 1245 that enables the user to select a program, channel, or television network to view. The television control panel 1245 may include buttons 1250 that may be selected to progress sequentially to the next or previous channel, program, or television network. The television control panel 1245 also may include one or more buttons 1255 that may be selected to automatically tune into a predetermined program, channel, or television network. For example, the viewer may have previously programmed the set-top box 1102 to associate each of five buttons 1255 numbered one through five with a particular channel, program, or television network. An additional EPG button 1260 may be selected by the viewer to launch or otherwise enable the viewer to access an electronic program guide.

The buttons 1250, 1255, and 1260 may be implemented, for example, by using tuning links similar to the ones disclosed in U.S. patent application Ser. No. 09/475,391, titled Television Chat Rooms, hereby incorporated by reference in its entirety. The viewer may select the buttons 1250, 1255, and 1260 which represent links that may be processed to change the channel of the set-top box 1102. The links may, but need not, refer to a specific channel. The set-top box 1102 may be programmed to determine a corresponding channel from a link that specifies a program or a television network.

When the viewer selects one of the buttons 1250 or 1255, or otherwise interacts with the television 1122 and/or set-top box 1102 in a manner that changes the channel, program, or television network, the client service 1105 is configured to send a TV select signal to the dynamic user identification system 1120. The TV select signal enables the dynamic user identification system 1120 to update the context database services to reflect the new context corresponding to the channel, program, or television network and to return a sorted list of users to the client services 1105. The client services 1105 updates the WhoIsWatching window 1200 accordingly to reflect the new channel, program, or television network.

Figure 13:
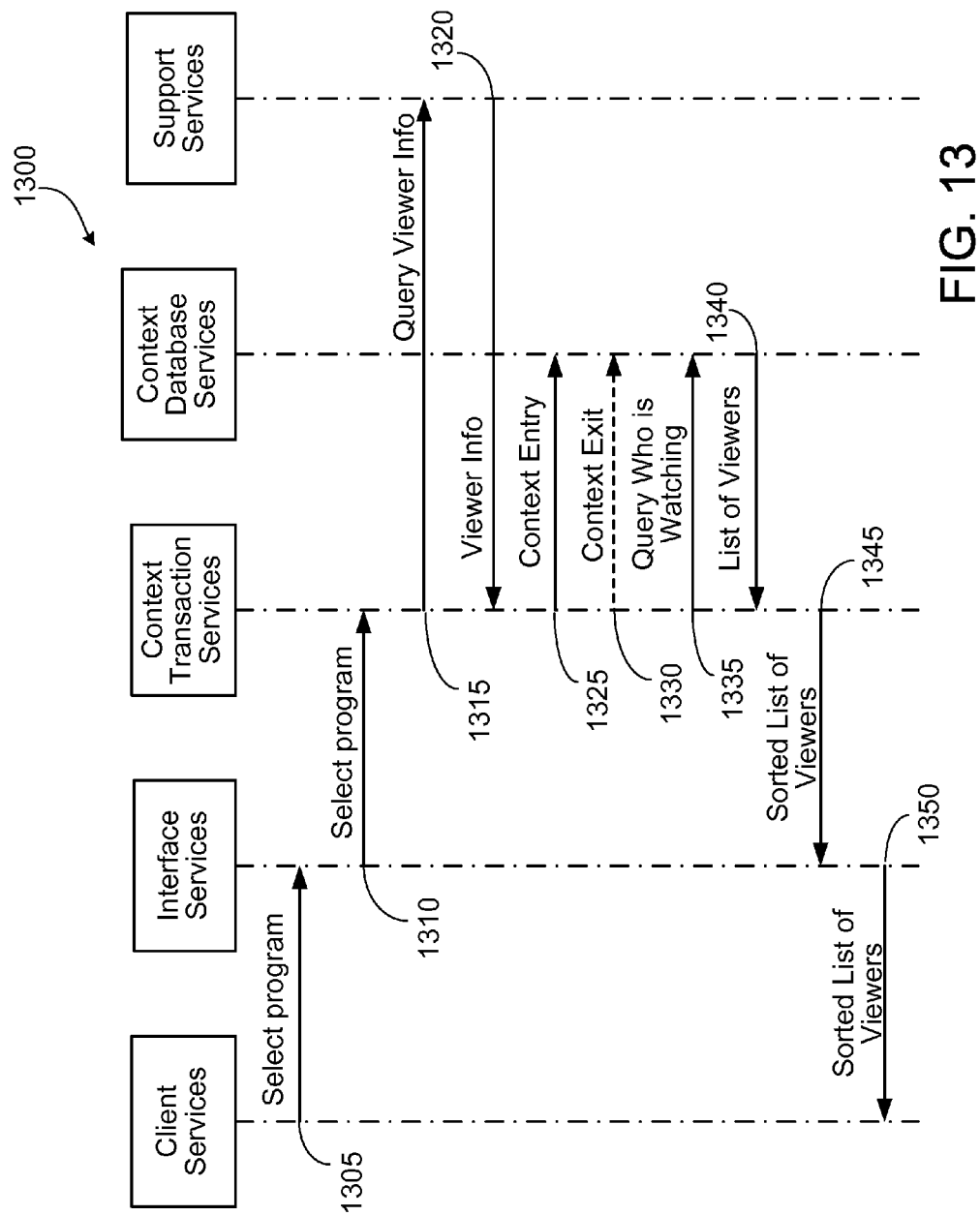
FIG. 13 is a transaction diagram illustrating an exemplary process implementable by the user identification system of FIG. 11.

FIG. 13 illustrates a process 1300 that may be used to implement the system of FIG. 11 when the viewer tunes to a specific channel, program, or television network. Upon tuning to a particular channel, program, or television network, the client services 1105 sends a "select program" message to the interface services (step 1305). The interface services communicates the "select program" message to the context transaction services (step 1310). Based on the "select program" message, the context transaction services may issue a "query viewer info" message to the support services (step 1315). The support services may respond to the "query viewer info" message by passing a "viewer info" message to the context transaction services (step 1320).

The context transaction services generate a "context entry" message based on the "select program" message and the "viewer info" message and communicate the "context entry" message to the context database services to indicate the presence of the user within the context (step 1325). In this case, the presence of the user within the context is the viewer tuning to the selected program, channel, or television network. If the viewer was previously tuned to a different program, channel, or television network, a "context exit" message is also generated and sent to the context database services to indicate that the viewer is no longer tuned to that program (step 1330).

The context transaction services also communicates a "query who is watching" message to the context database services (step 1335). The context database services generate a "list of viewers" message identifying individuals that are tuned to the selected channel, program, or television network (step 1340). The context transaction services generate a "sorted list of viewers" message based on the "list of viewers" message and preferences of the user and communicates the "sorted list of viewers" message to the interface services (step 1345). The interface services communicate the "sorted list of users" message to the client for presentation to the user (step 1350).

Other implementations are within the scope of the following claims. For example, some or all of the functionality of the set-top box 1102 may be performed by the television or monitor 1122 and/or the network server 1112. The television or monitor 1122 may have the ability to tune to multiple channels or programs. The set-top box 1102 may send multiple corresponding "select program" messages to the user identification system 1120. The user identification system 1120 may assign multiple contexts to the same viewer, each context corresponding to one of the multiple channels or programs to which the television or monitor 1122 is tuned.

The WhoIsWatching window 1200 also may include a graphical representation of the previous program, channel, or television network viewed by each of the other viewers prior to tuning to the program 1205. For example, the display panel 1230 may include an icon representing the previous program, channel, or television network next to the online identifiers of each of the one or more other viewers. The WhoIsWatching window 1200 also may include an interface element that enables the viewer to perceive a list of online identifiers corresponding to other viewers that were previously tuned to the program 1205. The list may be filtered based on identity, interest, or expertise.

What is claimed is:

1. A computer-implemented method comprising:
   accessing trait information for a viewer;
   determining a first video program that a viewing device associated with the viewer is receiving;
   based on the determined first video program, identifying a group of one or more other viewers that are associated with other viewing devices that are also receiving the first video program, wherein the group includes one or more viewers that do not share a trait with the viewer and one or more viewers that do share a trait with the viewer;
   determining an expertise rating associated with one or more topics for each of the one or more other viewers based on user ratings associated with trait information of the one or more other viewers;
   providing functionality for the viewer to communicate directly with one or more of the viewers of the group of other viewers using the viewing device;
   determining, based on the trait information for the viewer, a list of matching viewers, wherein the list of matching viewers comprises viewers within the group of one or more other viewers that includes an identification of an expert viewer sharing the most traits with the viewer based on at least the expertise rating for the expert viewer related to a topic of the first video program; and
   causing presentation, on the viewing device and to the viewer, of the list of matching viewers, wherein the presentation provides functionality for the viewer to communicate directly with one or more of the matching viewers using the viewing device.

2. The method of claim 1 wherein determining the first video program comprises determining a channel that the viewing device associated with the viewer is receiving.

3. The method of claim 1 wherein determining the first video program comprises determining a network that the viewing device associated with the viewer is receiving.

4. The method of claim 3 wherein determining a first video program comprises inferring the first video program based on the network.

5. The method of claim 1 wherein the trait shared with the viewer comprises information related to an age of the viewer.

6. The method of claim 1 wherein the trait shared with the viewer comprises information related to a demographic identifier of the viewer.

7. The method of claim 1 wherein the trait shared with the viewer comprises information related to an expertise rating of the viewer.

8. The method of claim 1 wherein the trait shared with the viewer comprises information related to an interest of the viewer.

9. The method of claim 1 wherein the trait shared with the viewer comprises information related to a participation status of the viewer.

10. The method of claim 1 wherein determining the list of matching viewers comprises:
    determining a current online status for one or more of the other viewers.

11. The method of claim 1, wherein causing presentation, on the viewing device and to the viewer, of the list of matching viewers further comprises:
    causing presentation, to the viewer, of one or more visual indicators that represent trait information for one or more of the matching viewers.

12. The method of claim 11 wherein causing presentation of the one or more visual indicators further comprises presenting contact information for one or more of the matching viewers.

13. The method of claim 12, wherein the contact information comprises an instant messaging username.

14. The method of claim 1 wherein causing presentation, on the viewing device and to the viewer, of the list of matching viewers further comprises:
    causing presentation, to the viewer, of a total number of viewers that are associated with viewing devices that are also receiving the first video program.

15. The method of claim 1 wherein causing presentation, to the viewer, of the list of matching viewers further comprises:
    causing presentation, to the viewer, of an identity of at least one viewer in the list of matching viewers.

16. The method of claim 1 further comprising causing presentation, to the viewer, of an indicator that identifies one or more additional users having expertise in a subject matter of the video program.

17. The method of claim 1 wherein the functionality for the viewer to communicate with one or more of the matching viewers comprises instant messaging functionality.

18. The method of claim 1, further comprising:
    accessing trait information for a second viewer;
    determining that a second viewing device associated with the second viewer is receiving the first video program;
    determining, based on the trait information for the second viewer, a second list of matching viewers, wherein the second list of matching viewers comprises viewers within the group of one or more other viewers that share a trait with the second viewer and wherein the second list of matching viewers differs from the first list of matching viewers; and causing presentation, on the viewing device and to the second viewer, of the second list of matching viewers, wherein the presentation provides functionality for the second viewer to communicate directly with one or more of the matching viewers using the viewing device.

19. A non-transitory computer-readable medium having embodied thereon a computer program, the computer program comprising one or more code segments that, when executed, cause a computer to:

access trait information for a viewer;

determine a first video program that a viewing device associated with the viewer is receiving;

based on the determined first video program, identify a group of one or more other viewers that are associated with other viewing devices that are also receiving the first video program, wherein the group includes one or more viewers that do not share a trait with the viewer and one or more viewers that do share a trait with the viewer;

determining an expertise rating associated with one or more topics for each of the one or more other viewers based on user ratings associated with trait information of the one or more other viewers;

providing functionality for the viewer to communicate directly with one or more of the viewers of the group of other viewers using the viewing device;

determine, based on the trait information for the viewer, a list of matching viewers, wherein the list of matching viewers comprises viewers within the group of one or more other viewers that includes an identification of an expert viewer sharing the most traits with the viewer based on at least the expertise rating for the expert viewer related to a topic of the first video program; and cause presentation, on the viewing device and to the viewer, of the list of matching viewers, wherein the presentation provides functionality for the viewer to communicate directly with one or more of the matching viewers using the viewing device.

20. The medium of claim 19 wherein the computer program further causes the computer to:

cause presentation, to the viewer, of one or more visual indicators that represent trait information for one or more of the matching viewers.

21. A computer-implemented method, comprising:

providing a user with an online interface that enables the user to select one or more digital media items from a server system;

determining that the user has selected a digital media item;

determining a contact list associated with the user, wherein the contact list includes one or more users that have selected the digital media item that do not share a trait with the user and one or more users that have selected the digital media item that do share a trait with the user;

determining an expertise rating for each of the one or more users on the contact list based on user ratings associated with trait information of the one or more users on the contact list;

providing functionality for the user to communicate directly with one or more of the users on contact list;

generating a list of matching users, wherein the list of matching users comprises one or more users in the user's contact list that includes an identification of an expert sharing the most traits with the user based on at least the expertise rating for the expert related to a topic of the selected digital media item; and displaying the list of matching users to the user through the online interface.

22. The computer-implemented method of claim 21, wherein displaying the list of matching users further comprises:

enabling the user to communicate with one or more users in the list of matching users through the online interface.

23. A computer system, comprising:

a processing system comprising one or more processors;

a memory system comprising one or more tangible computer readable media, the memory system storing computer instructions that, when executed by the server system, cause the computer system to perform the operations of:

providing a user with an online interface that enables the user to select one or more digital media items from a server system;

determining that the user has selected a digital media item;

determining a contact list associated with the user, wherein the contact list includes one or more users that have selected the digital media item that do not share a trait with the user and one or more users that have selected the digital media item that do share a trait with the user;

determining an expertise rating for each of the one or more users on the contact list based on user ratings associated with trait information of the one or more users on the contact list;

providing functionality for the user to communicate directly with one or more of the users on contact list;

generating a list of matching users, wherein the list of matching users comprises one or more users in the user's contact list that includes an identification of an expert sharing the most traits with the user based on at least the expertise rating for the expert related to a topic of the selected digital media; and displaying the list of matching users to the user through the online interface.

24. The computer system of claim 23, wherein displaying the list of matching users further comprises:

enabling the user to communicate with one or more users in the list of matching users through the online interface.

* * * * *